(12) United States Patent
Miyoshino et al.

(10) Patent No.: US 10,430,629 B2
(45) Date of Patent: Oct. 1, 2019

(54) NON-TRANSITORY COMPUTER-READABLE MEDIUM STORING INFORMATION PROCESSING PROGRAM AND INFORMATION PROCESSING DEVICE

(71) Applicant: KABUSHIKI KAISHA DDS, Nagoya-shi, Aichi (JP)

(72) Inventors: Kenji Miyoshino, Nagoya (JP); Kiyohito Tokuda, Nagoya (JP); Tatsuki Yoshimine, Nagoya (JP); Noriyuki Gonda, Nagoya (JP); Yuhei Niwa, Nagoya (JP)

(73) Assignee: KABUSHIKI KAISHA DDS, Nagoya (JP)

( * ) Notice: Subject to any disclaimer, the term of this patent is extended or adjusted under 35 U.S.C. 154(b) by 100 days.

(21) Appl. No.: 15/868,159

(22) Filed: Jan. 11, 2018

(65) Prior Publication Data

US 2018/0137331 A1 May 17, 2018

Related U.S. Application Data

(63) Continuation of application No. PCT/JP2016/071735, filed on Jul. 25, 2016.

(30) Foreign Application Priority Data

Jul. 31, 2015 (JP) ................. 2015-152611

(51) Int. Cl.
*G06K 9/00* (2006.01)
*G06K 9/62* (2006.01)
(Continued)

(52) U.S. Cl.
CPC ........ *G06K 9/00013* (2013.01); *G06K 9/001* (2013.01); *G06K 9/0002* (2013.01);
(Continued)

(58) Field of Classification Search
CPC ............ G06K 9/00013; G06K 9/0002; G06K 9/00067; G06K 9/001; G06K 9/3233;
(Continued)

(56) References Cited

U.S. PATENT DOCUMENTS 5,426,708 A 6/1995 Hamada et al.
7,643,660 B1* 1/2010 Bauchspies ............ G06K 9/001
382/124
(Continued)

FOREIGN PATENT DOCUMENTS

JP 3057590 B2 6/2000
JP 2007-202912 A 8/2007
(Continued)

OTHER PUBLICATIONS

Aug. 16, 2016 International Search Report issued in International Patent Application No. PCT/JP2016/071735.

*Primary Examiner* — David F Dunphy
(74) *Attorney, Agent, or Firm* — Oliff PLC

(57) ABSTRACT

A computer-readable medium and an information processing device are provided that are capable of generating collation information that is unlikely to be affected by acquisition conditions of biometric information. An image is acquired (S1), and a base point is determined from the image (S2). Sample information indicating a change in color information of a surrounding area of the base point is acquired (S3). The sample information is information that associates a plurality of samples with center information corresponding to positions on the image of first reference points. The sample is information that associates color information of second reference points with position information of the second reference points. Based on the acquired sample information, frequency information is generated (S4). The frequency information associates the center information with a fre- (Continued)

quency component of a change in the color information with respect to the position information calculated for each of the first reference points.

10 Claims, 28 Drawing Sheets

(51) Int. Cl.
  *G06T 7/00* (2017.01)
  *G06T 7/73* (2017.01)
  *G06T 7/90* (2017.01)
  *G06K 9/32* (2006.01)
  *G06K 9/46* (2006.01)

(52) U.S. Cl.
  CPC ....... *G06K 9/00067* (2013.01); *G06K 9/3233* (2013.01); *G06K 9/4652* (2013.01); *G06K 9/4671* (2013.01); *G06K 9/6202* (2013.01); *G06K 9/6211* (2013.01); *G06K 9/6215* (2013.01); *G06T 7/74* (2017.01); *G06T 7/90* (2017.01); *G06T 2207/10024* (2013.01)

(58) Field of Classification Search
  CPC .. G06K 9/4652; G06K 9/4671; G06K 9/6202; G06K 9/6211; G06K 9/6215; G06T 7/74; G06T 7/90
  See application file for complete search history.

(56) References Cited

U.S. PATENT DOCUMENTS

| | | |
|---|---|---|
| 2002/0018585 A1* | 2/2002 | Kim .................. G06K 9/00067 382/125 |
| 2002/0181749 A1 | 12/2002 | Matsumoto et al. |
| 2007/0297655 A1 | 12/2007 | Monden |
| 2017/0019716 A1* | 1/2017 | Neumeier ........ H04N 21/44008 |
| 2018/0241563 A1* | 8/2018 | Benchetrit ............ G06F 19/321 |

FOREIGN PATENT DOCUMENTS

| | | |
|---|---|---|
| WO | 01/055966 A1 | 8/2001 |
| WO | 2006/009319 A1 | 1/2006 |

* cited by examiner

FIG. 4
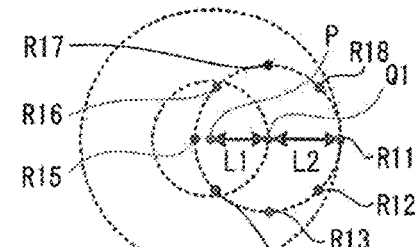
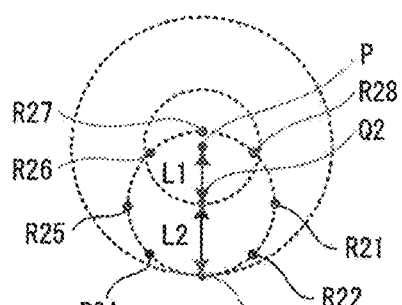
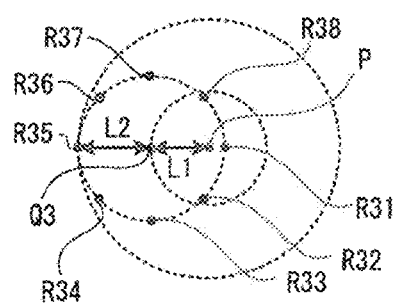
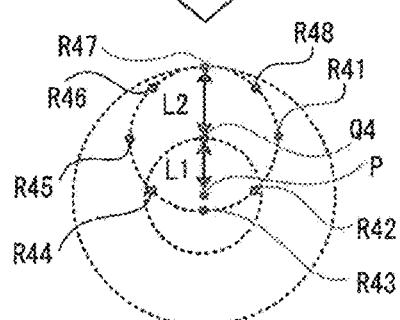
| CENTER INFORMATION | POSITION INFORMATION | COLOR INFORMATION |
|---|---|---|
| Q1 | R11 | C11 |
| | R12 | C12 |
| | ⋮ | ⋮ |
| | R18 | C18 |
| CENTER INFORMATION | POSITION INFORMATION | COLOR INFORMATION |
|---|---|---|
| Q2 | R21 | C21 |
| | R22 | C22 |
| | ⋮ | ⋮ |
| | R28 | C28 |
| CENTER INFORMATION | POSITION INFORMATION | COLOR INFORMATION |
|---|---|---|
| Q3 | R31 | C31 |
| | R32 | C32 |
| | ⋮ | ⋮ |
| | R38 | C38 |
| CENTER INFORMATION | POSITION INFORMATION | COLOR INFORMATION |
|---|---|---|
| Q4 | R41 | C41 |
| | R42 | C42 |
| | ⋮ | ⋮ |
| | R48 | C48 |

| TEST BASE POINT | REFERENCE BASE POINT | SIMILARITY DEGREE W |
|---|---|---|
| PT1 | PU1 | 80 |
| | PU5 | 20 |
| | PU3 | 19 |
| | ⋮ | ⋮ |
| PT2 | PU1 | 60 |
| | PU2 | 59 |
| | PU9 | 38 |
| | ⋮ | ⋮ |
| ⋮ | ⋮ | ⋮ |
| PT5 | PU10 | 80 |
| | PU7 | 23 |
| | PU9 | 12 |
| | ⋮ | ⋮ |

85

86

FIG. 25
| | FOR REFERENCE | FOR TESTING |
|---|---|---|
| SAMPLE IMAGE |  48 | 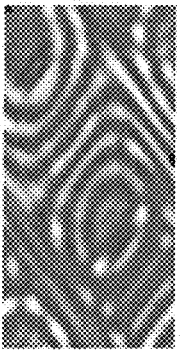 98 |
| FREQUENCY IMAGE |  49 |  99 |

NON-TRANSITORY COMPUTER-READABLE MEDIUM STORING INFORMATION PROCESSING PROGRAM AND INFORMATION PROCESSING DEVICE

CROSS REFERENCE TO RELATED APPLICATION

This application is a Continuing application of International Application No. PCT/JP2016/071735, filed Jul. 25, 2016, which claims priority from Japanese Patent Application No. 2015-152611, filed on Jul. 31, 2015. This disclosure of the foregoing application is hereby incorporated by reference in its entirety.

BACKGROUND

The present disclosure relates to a non-transitory computer-readable medium storing an information processing program and an information processing device that analyze an image and generate collation information used for collation of biometric information.

SUMMARY

Recently, various types of fingerprint authentication devices that can be installed in mobile devices, such as a smart phone and a notebook personal computer, have been proposed. For example, Patent Publication No. 3057590 discloses a personal identification device that uses, as collation information used for collation, information obtained by performing frequency spectrum conversion on a fingerprint image. Thus, the personal identification device is unlikely to be affected by disturbance, such as inclination of a finger with respect to a fingerprint sensor.

In accordance with miniaturization of a fingerprint sensor that is installed in a mobile device, an image of an acquired finger print becomes smaller than in related art. When a user performs an input operation of a fingerprint, in many cases, the user causes a finger of the hand that is holding the mobile device to touch the fingerprint sensor installed in the mobile device. In this case, since the user has to move the finger in an unnatural direction, the input operation of the fingerprint tends to become unstable. More specifically, an image acquired under conditions in which a position and an angle are different from those at the time of registration tends to be acquired. Accordingly, even when the size of the image is smaller than in the related art, a technology is required that generates collation information that is unlikely to be affected by acquisition conditions of biometric information.

It is an object of the present disclosure to provide a non-transitory computer-readable medium storing an information processing program and an information processing device that are capable of generating collation information that is unlikely to be affected by acquisition conditions of biometric information even when a size of an image representing the biometric information is smaller than in related art.

According to a first aspect of a present disclosure, a non-transitory computer-readable medium storing computer-readable instructions that are executed by a processor provided in an information processing device comprising a storage portion, the computer-readable instructions, when executed, instructing the processor to perform processes comprising an image acquisition step, a base point determination step, a sample information acquisition step, a frequency information acquisition step, and a storage control step. The image acquisition step acquires an image. The base point determination step determines a base point from the image acquired by the image acquisition step. The sample information acquisition step acquires sample information that is information indicating a change in color information of a surrounding area of the base point determined by the base point determination step. The sample information acquisition step acquires a sample for each of a plurality of second reference points whose positions are different from each other. The sample is information that associates color information with position information. The color information corresponds to the second reference points, which are points on a circumference of a circle whose center is a first reference point and whose radius is a second predetermined value. The position information is information corresponding to the positions on the image of the second reference points. The first reference point is a point in the image whose distance from the base point is a first predetermined value. The sample information acquisition step acquires, as the sample information, information that associates the acquired plurality of samples with center information that is information corresponding to a position on the image of the first reference point. The frequency information acquisition step acquires frequency information that is generated on the basis of the sample information for each of a plurality of the first reference points acquired by the sample information acquisition step. The frequency information acquisition step calculates a frequency component of a change in the color information with respect to the position information, for each of the plurality of first reference points. The frequency information acquisition step acquires the frequency information that is information that associates the calculated frequency component with the center information. The storage control step causes the storage portion to store the frequency information acquired by the frequency information acquisition step, as collation information used for collation of biometric information.

By executing the information processing program stored in the non-transitory computer-readable medium of a first aspect, the computer can generate the frequency information indicating a change in color of the surrounding area of the base point in the image. A distance between the base point and the first reference points is the first predetermined value. In other words, the first reference points are points on the circumference of a circle whose center is the base point and whose radius is the first predetermined value. Therefore, if the collation information is generated on the basis of the program, the computer can generate the collation information that can cancel out any influence resulting from the rotation or movement, with respect to a base point, of the information represented by the image (the biometric information represented by a fingerprint image or a vein image, for example).

According to the non-transitory computer-readable medium of the first aspect, the information processing program may further instruct the processor to perform an extraction step of extracting a feature point by analyzing the image acquired by the image acquisition step, wherein the base point determination step determines the feature point extracted by the extraction step to be the base point. By executing the information processing program in this case, the frequency information is calculated on the basis of the feature points extracted from the image. Therefore, even when the number of the feature points extracted from the image is small, the computer can generate the information indicating the change in color of the surrounding area of the feature points. For example, the frequency information can be used to associate, with each other, the feature points extracted from a test image used for the collation of the biometric information, the feature points extracted from a registration image stored in the storage portion, and the feature points used as reference targets.

According to the non-transitory computer-readable medium of the first aspect, the information processing program may further instruct the processor to perform a direction acquisition step of acquiring a direction of the feature point extracted by the extraction step, wherein in the sample information acquisition step, the center information is set on the basis of the direction of the feature point acquired by the direction acquisition step. If the processing is performed in accordance with the information processing program in this case, the computer can acquire the frequency information while taking account of the influence resulting from the rotation or movement, with respect to the base point, of the information represented by the image.

According to the non-transitory computer-readable medium of the first aspect, the information processing program may further instruct the processor to perform a correspondence determination step of determining a positional correspondence, which is a correspondence between the position information of the frequency information for testing, which is used for the collation of the biometric information, and the position information of the frequency information for reference, which is stored in the storage portion; and a similarity degree calculation step of calculating an information similarity degree, which is a degree of similarity between the frequency information for testing and the frequency information for reference, on the basis of the positional correspondence determined by the correspondence determination step. If the processing is performed in accordance with the information processing program in this case, the computer can compare the frequency information for testing and the frequency information for registration and can calculate the degree of similarity between them, while taking account of the influence resulting from the rotation or movement, with respect to the base point, of the information represented by the image.

According to the non-transitory computer-readable medium of the first aspect, the sample information acquisition step includes a first setting step of setting the plurality of first reference points for the base point in accordance with a first predetermined condition, a second setting step of setting the plurality of second reference points for each of the plurality of first reference points set by the first setting step, in accordance with a second predetermined condition, a determination step of determining, for each of the plurality of first reference points, whether all the plurality of second reference points set by the step are within the image, and an acquisition step of acquiring the sample information relating to the first reference point, of the plurality of first reference points, for which it is determined by the determination step that all the plurality of second reference points are within the image, and the similarity degree calculation step includes a first similarity degree calculation step of calculating, on the basis of, from among the frequency information for testing, the frequency information relating to at least one point in the image, which is the first reference point, for which it is determined by the determination step that all the plurality of second reference points are within the image, and on the basis of the correspondence determined by the correspondence determination step, a first similarity degree between the frequency information for testing relating to the at least one point in the image and the frequency information for reference, and a second similarity degree calculation step of calculating, on the basis of, from among the frequency information for testing, the frequency information relating to at least one point outside the image, which is the first reference point, for which it is not determined by the determination step that all the plurality of second reference points are within the image, and on the basis of the correspondence determined by the correspondence determination step, a second similarity degree between the frequency information for testing relating to the at least one point outside the image and the frequency information for reference, and an information similarity degree calculation step of calculating the information similarity degree on the basis of the first similarity degree and the second similarity degree.

When the size of the image acquired by the image acquisition step is relatively small, the number of the base points that can be set for the image is smaller than when the size of the image is relatively large. Meanwhile, a case is also assumed in which the second reference points are set outside the image with respect to the base point, depending on the size of the image, coordinates of the base point, the first predetermined value and the second predetermined value. From the viewpoint of efficiently and effectively acquiring the frequency information by the computer using a small number of the base points, it is preferable to acquire the information by which the degree of similarity can be calculated even when some of the second reference points are set outside the image. If the processing is performed in accordance with the information processing program in this case, the computer can acquire the frequency information even when there is the first reference point for which the second reference points are set outside the image. The computer can appropriately calculate the degree of similarity on the basis of the acquired frequency information.

According to a second aspect of a present disclosure, an information processing device includes a storage portion, an image acquisition portion, a base point determination portion, a sample information acquisition portion, a frequency information acquisition portion, and a storage control portion. The image acquisition portion acquires an image. The base point determination portion determines a base point from the image acquired by the image acquisition portion. The sample information acquisition portion acquires sample information that is information indicating a change in color information of a surrounding area of the base point determined by the base point determination portion. The sample information acquisition portion acquires a sample for each of a plurality of second reference points whose positions are different from each other. The sample is information that associates color information with position information. The color information corresponds to the second reference points, which are points on a circumference of a circle whose center is a first reference point and whose radius is a second predetermined value. The position information is information corresponding to the positions on the image of the second reference points. The first reference point is a point in the image whose distance from the base point is a first predetermined value. The sample information acquisition portion acquires, as the sample information, information that associates the acquired plurality of samples with center information that is information corresponding to a position on the image of the first reference point. The frequency information acquisition portion acquires frequency information that is generated on the basis of the sample information for each of a plurality of the first reference points acquired by the sample information acquisition portion. The frequency information acquisition portion calculates a frequency component of a change in the color information with respect to the position information, for each of the plurality of first reference points. The frequency information acquisition portion acquires the frequency information that is information that associates the calculated frequency component with the center information. The storage control portion causes the storage portion to store the frequency information acquired by the frequency information acquisition portion, as collation information used for collation of biometric information.

The information processing device of a second aspect can generate the frequency information indicating a change in color of the surrounding area of the base point in the image. A distance between the base point and the first reference points is the first predetermined value. In other words, the first reference points are points on the circumference of a circle whose center is the base point and whose radius is the first predetermined value. Therefore, the information processing device can generate the collation information that can cancel out the influence resulting from the rotation or movement, with respect to the base point, of the information represented by the image (the biometric information represented by a fingerprint image or a vein image, for example).

BRIEF DESCRIPTION OF THE DRAWINGS

Embodiments of the disclosure will be described below in detail with reference to the accompanying drawings in which:

FIG. 4 is an explanatory diagram of an acquisition procedure of samples 71, sample data 72 and sample information 73.

FIG. 22 is an explanatory diagram of a candidate list 85.

FIG. 25 is an explanatory diagram of sample images 48 and 98 and frequency images 49 and 99 that are generated in accordance with a flowchart of collation information processing according to a second embodiment.

DETAILED DESCRIPTION OF EMBODIMENTS

An embodiment of the present disclosure will be explained with reference to the drawings. Specific numerical values exemplified in the embodiment below are examples, and the present disclosure is not limited to these numerical values. In the explanation below, image data is simply referred to as an "image."

An information processing device 10 will be explained with reference to FIG. 1. The information processing device 10 is an electronic device provided with a function to generate collation information used for collation from biometric information. The biometric information is selected from among various types of biometric information that can be acquired as an image, such as a face image, a fingerprint, a vein, an iris or the like. The biometric information of the present example is a fingerprint. The information processing device 10 of the present example is a known smart phone. The information processing device 10 is provided with functions to analyze an image obtained by capturing a fingerprint, generate reference collation information that is necessary for the collation using the fingerprint, and store the generated reference collation information in a data base (DB) 28 stored in a flash memory 4 of the information processing device 10. The information processing device 10 is provided with functions to analyze the image obtained by capturing the fingerprint, generate test collation information that is necessary for the collation using the fingerprint, and determine correspondence between the generated test collation information and the reference collation information stored in the DB 28.

Figure 1:
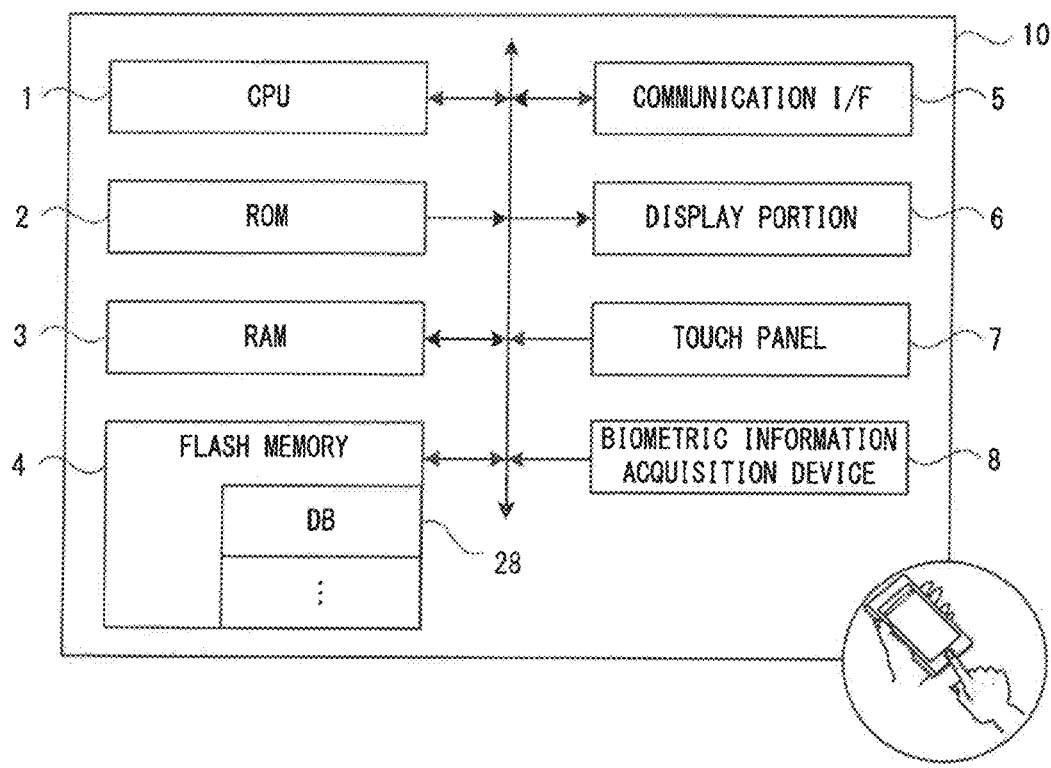
FIG. 1 is a block diagram of an information processing device 10.

As shown in FIG. 1, the information processing device 10 is provided with a CPU 1, a ROM 2, a RAM 3, the flash memory 4, a communication IF 5, a display portion 6, a touch panel 7 and a biometric information acquisition device 8. The CPU 1 is a processor that performs control of the information processing device 10. The CPU 1 is electrically connected to the ROM 2, the RAM 3, the flash memory 4, the communication I/F 5, the display portion 6, the touch panel 7 and the biometric information acquisition device 8. The ROM 2 stores a BIOS, a boot program and initial setting values. The RAM 3 stores various temporary data. The flash memory 4 stores a program that is executed by the CPU 1 to control the information processing device 10, an operating system (OS) and the DB 28. The communication I/F 5 is a controller to perform communication with an external device. The display portion 6 is a liquid crystal display. The touch panel 7 is provided on the surface of the display portion 6. The biometric information acquisition device 8 acquires an image obtained by capturing biometric information. The biometric information acquisition device 8 of the present example is an area-type sensor of a capacitance type. Specifically, the biometric information acquisition device 8 is a sensor that determines the ridges and troughs of the fingerprint from an electric charge amount of a matrix of surface electrodes, and shows color information per pixel using 256 gray-scale values. The color information is information indicating color. The resolution is, for example, 508 dots per inch (dpi).

Figure 2:
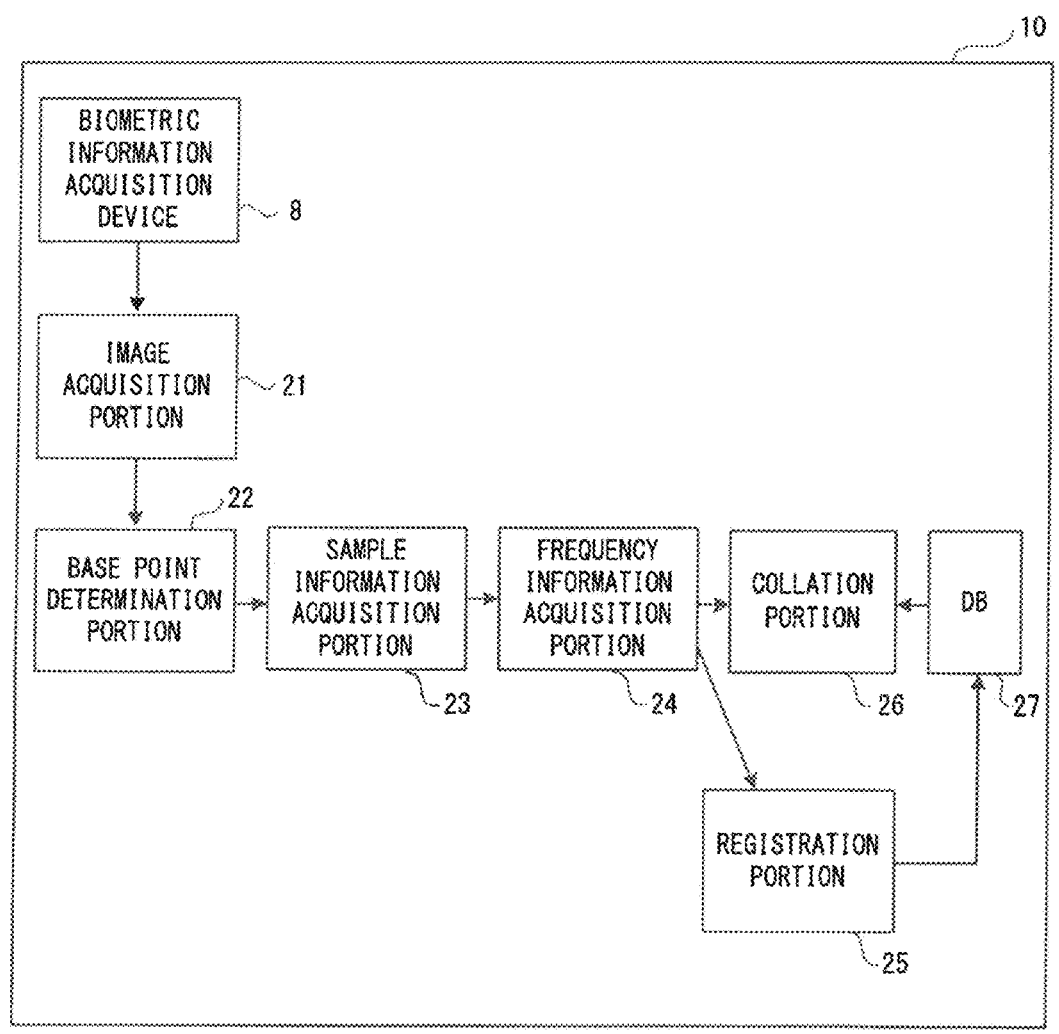
FIG. 2 is a functional block diagram of the information processing device 10.

An overview of the functions of the information processing device 10 will be explained with reference to FIG. 2 and FIG. 3. The information processing device 10 has the biometric information acquisition device 8, an image acquisition portion 21, a base point determination portion 22, a sample information acquisition portion 23, a frequency information acquisition portion 24, a registration portion 25, a collation portion 26 and a DB 27, and processing that corresponds to a functional block of each of them is performed by the CPU 1 (refer to FIG. 1).

The biometric information acquisition device 8 outputs an image to the image acquisition portion 21. The image acquisition portion 21 acquires the image output from the biometric information acquisition device 8 (S1). The base point determination portion 22 determines a base point on the basis of the image acquired by the image acquisition portion 21 (S2). The base point is a point determined in accordance with predetermined conditions. In a first embodiment, the base point is a feature point. For example, the feature point is at least one of a point extracted in accordance with a minutiae extraction method (refer to Japanese Patent No. 1289457, for example), and a point extracted in accordance with a scale-invariant feature transform (SIFT) (refer to U.S. Pat. No. 6,711,293, for example). The feature point of the present example is extracted in accordance with the minutiae extraction method described in Japanese Patent No. 1289457. The base point is represented by two-dimensional coordinates of an image coordinate system. It is assumed that the two-dimensional coordinates of the image coordinate system of the present example are coordinates that are set in units of pixels on the basis of positions of pixels in the image. The two-dimensional coordinates of the image coordinate system will be described later.

The sample information acquisition portion 23 acquires sample information (S3). The sample information is information indicating a change in the color information of a surrounding area of the base point determined by the base point determination portion 22. The sample information is information that associates the color information with information corresponding to positions (position information and center information) indicating acquisition conditions of the color information. The color information is information indicating a color of second reference points in the image. When the second reference points have coordinates in units of sub-pixels, the color information is acquired using known bilinear interpolation or bicubic interpolation. The second reference points are points on the circumference of a circle whose center is a first reference point and whose radius is a second predetermined value. The first reference point is a point in the image whose distance from the base point is a first predetermined value. The position information is information corresponding to positions, on the image, of the second reference points. The center information is information corresponding to the positions, on the image, of the first reference points.

The sample information is acquired, for example, by the following procedure. In order to simplify the explanation, a case will be explained in which four first reference points Q are set for one base point P, and eight second reference points R are set for each of the first reference points Q. The sample information acquisition portion 23 determines, as first reference points Q1 to Q4, four points in the image whose distance from the base point P determined by the base point determination portion 22 is a first predetermined value L1. It is sufficient that a method for setting the first reference points Q is a method determined in advance. In the first embodiment, the sample information acquisition portion 23 sets the first reference points Q on the basis of coordinates of the base point P, the first predetermined value L and a direction of the base point (the feature point). More specifically, as shown in FIG. 4, the sample information acquisition portion 23 sets a point which is in the direction of the base point (the feature point) (for example, in the rightward direction) in relation to the base point P and whose distance from the base point P is the first predetermined value L1, as the point Q1 that is first in an order of acquisition. From among points on the circumference of the circle whose center is the base point P and whose radius is the first predetermined value L1, the sample information acquisition portion 23 sets a point that is in a position (below the base point P) 90 degrees clockwise from the point Q1, as the point Q2 that is second in the order of acquisition. From among the points on the circumference of the circle whose center is the base point P and whose radius is the first predetermined value L1, the sample information acquisition portion 23 sets a point that is in a position (to the left of the base point P) 90 degrees clockwise from the point Q2, as the point Q3 that is third in the order of acquisition. From among the points on the circumference of the circle whose center is the base point P and whose radius is the first predetermined value L1, the sample information acquisition portion 23 sets a point that is in a position (above the base point P) 90 degrees clockwise from the point Q3, as the point Q4 that is fourth in the order of acquisition.

In a second embodiment, the sample information acquisition portion 23 sets the first reference points Q in accordance with positions in the image in relation to the base point P. More specifically, as shown in FIG. 4, the sample information acquisition portion 23 sets, for example, a point which is to the right of the base point P and whose distance from the base point P is the first predetermined value L1, as the point Q1 that is first in the order of acquisition. The sample information acquisition portion 23 sets a point which is below the base point P and whose distance from the base point P is the first predetermined value L1, as the point Q2 that is second in the order of acquisition. The sample information acquisition portion 23 sets a point which is to the left of the base point P and whose distance from the base point P is the first predetermined value L1, as the point Q3 that is third in the order of acquisition. The sample information acquisition portion 23 sets a point which is above the base point P and whose distance from the base point P is the first predetermined value L1, as the point Q4 that is fourth in the order of acquisition. Each of the first reference points Q1 to Q4 is arranged at equal intervals on the circumference of the circle whose center is the base point P and whose radius is the first predetermined value L1.

The center information is acquired for each of the plurality of first reference points Q1 to Q4 whose positions are different from each other. The center information is information corresponding to the positions of the first reference points. It is sufficient that the center information is information that defines the positions of the first reference points in relation to the base point. For example, the center information may be absolute coordinates (for example, coordinates of the image coordinate system), relative coordinates (for example, coordinates of a local coordinate system), an angle in relation to a base point, or the like. When the order of acquisition of the first reference points is determined with respect to the base point, the center information may be the order of acquisition of the first reference points. In the present example, the order of acquisition of the first reference points is acquired as the center information. The order of acquisition of the first reference points Q1 to Q4 is 1 to 4, respectively.

A plurality of samples 71 are acquired for each of the acquired plurality of pieces of center information. The samples 71 are information that associates the color information corresponding to second reference points R with the position information. The second reference points R are points on the circumference of a circle whose center is the first reference point Q corresponding to the center information and whose radius is a second predetermined value L2. In the present example, as shown in FIG. 4, with respect to a first reference point Qn, the sample information acquisition portion 23 determines second reference points Rn1 to Rn8 (n is an integer from 1 to 4) in accordance with positions in the image in relation to the first reference point Qn. The sample information acquisition portion 23 sets, as Rn1, a point which is to the right of the first reference point Qn and whose distance from the first reference point Q is the second predetermined value L2. The sample information acquisition portion 23 sets, as the second reference point Rn (m+1), a point which is on the circumference of the circle whose center is the first reference point Q and whose radius is the second predetermined value L2, and which is in a position 45 degrees clockwise from a second reference point Rnm. m is an integer from 1 to 7. The second reference points Rn1 to Rn8 are respectively arranged at equal intervals on the circumference of the circle whose center is the first reference point Qn and whose radius is the second predetermined value L2.

The position information is information corresponding to the positions of the second reference points R. It is sufficient that the position information is information that defines the positions of the second reference points with respect to the base point. For example, the position information may be absolute coordinates (for example, coordinates of the image coordinate system), relative coordinates (for example, coordinates of the local coordinate system), an angle in relation to the base point, or the like. When the order of acquisition of the second reference points is determined with respect to the base point, the position information may be the order of acquisition of the second reference points. In the present example, the order of acquisition of the second reference points is acquired as the position information. The order of acquisition of the second reference points Rn1 to Rn8 is 1 to 8, respectively. The plurality of samples 71 are samples that are acquired for each of the plurality of second reference points R whose positions are different from each other. The sample information acquisition portion 23 uses, as sample data 72, information that associates the plurality of samples 71 acquired for one of the first reference points Q with the center information. The sample data 72 corresponding to the plurality of first reference points Q set for the single base point P is taken as sample information 73.

The frequency information acquisition portion 24 acquires frequency information on the basis of the sample information acquired from the sample information acquisition portion 23 (S4). The frequency information is information obtained by calculating frequency components of changes in the color information with respect to the position information, for each of the plurality of first reference points, and associating the frequency components calculated for each of the plurality of first reference points with the position information. The frequency components of the present example are a one-dimensional group delay spectrum that is calculated in accordance with a known method (refer to Japanese Patent No. 3057590 and Japanese Patent No. 3799057).

The registration portion 25 causes the reference collation information that is used for the collation of the biometric information to be stored in the DB 28 (S5). The collation information includes the frequency information acquired by the frequency information acquisition portion 24. In addition to the frequency information, the collation information of the present example includes the coordinates of the base point (the feature point) and the direction of the base point (the feature point). The collation portion 26 collates the test collation information with the reference collation information stored in the DB 28.

Figure 3:
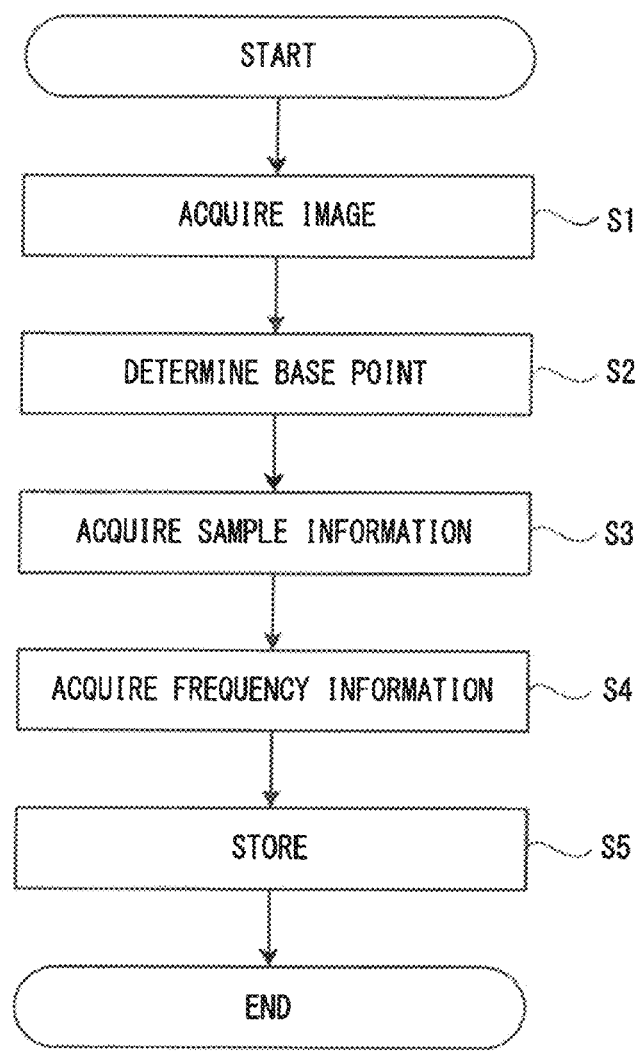
FIG. 3 is a flowchart of acquisition processing.

The processing at step S1 in FIG. 3 corresponds to an image acquisition step of the present disclosure. The CPU 1 (the image acquisition portion 21) that performs the processing at step S1 functions as image acquisition portion of the present disclosure. The processing at step S2 corresponds to a base point determination step of the present disclosure. The CPU 1 (the base point determination portion 22) that performs the processing at step S2 functions as base point determination portion of the present disclosure. The processing at step S3 corresponds to a sample information acquisition step of the present disclosure. The CPU 1 (the sample information acquisition portion 23) that performs the processing at step S3 functions as sample information acquisition portion of the present disclosure. The processing at step S4 corresponds to a frequency information acquisition step of the present disclosure. The CPU 1 (the frequency information acquisition portion 24) that performs the processing at step S4 functions as frequency information acquisition portion of the present disclosure. The processing at step S5 corresponds to a storage control step of the present disclosure. The CPU 1 that performs the processing at step S5 functions as storage control portion of the present disclosure.

1. Processing at Registration

Collation information processing of the first embodiment that is performed by the information processing device 10 will be explained with reference to FIG. 5 to FIG. 23, taking an example in which the collation information is registered. The collation information processing is started when a user inputs a start command. The start command includes a command relating to whether to register the collation information acquired from the image as the reference collation information in the DB 28, or whether to calculate a degree of similarity between the collation information and the reference collation information registered in the DB 28. When the CPU 1 of the information processing device 10 detects the input of the start command of the collation information processing, the CPU 1 reads out, to the RAM 3, an information processing program to execute the collation information processing stored in the flash memory 4, and performs processing of respective steps to be described below, in accordance with instructions included in the information processing program. In the present example, feedback processing that prompts re-input is performed until the biometric information that satisfies a requirement (for example, the brightness of the image) to extract the feature point is acquired. The biometric information that is acquired in the collation information processing satisfies a requirement to extract the collation information from the biometric information using an algorithm. Information and data acquired or generated in the course of the processing is stored in the RAM 3 as appropriate. Various setting values that are necessary for the processing are stored in advance in the flash memory 4. Hereinafter, step is abbreviated to "S."

Figure 5:
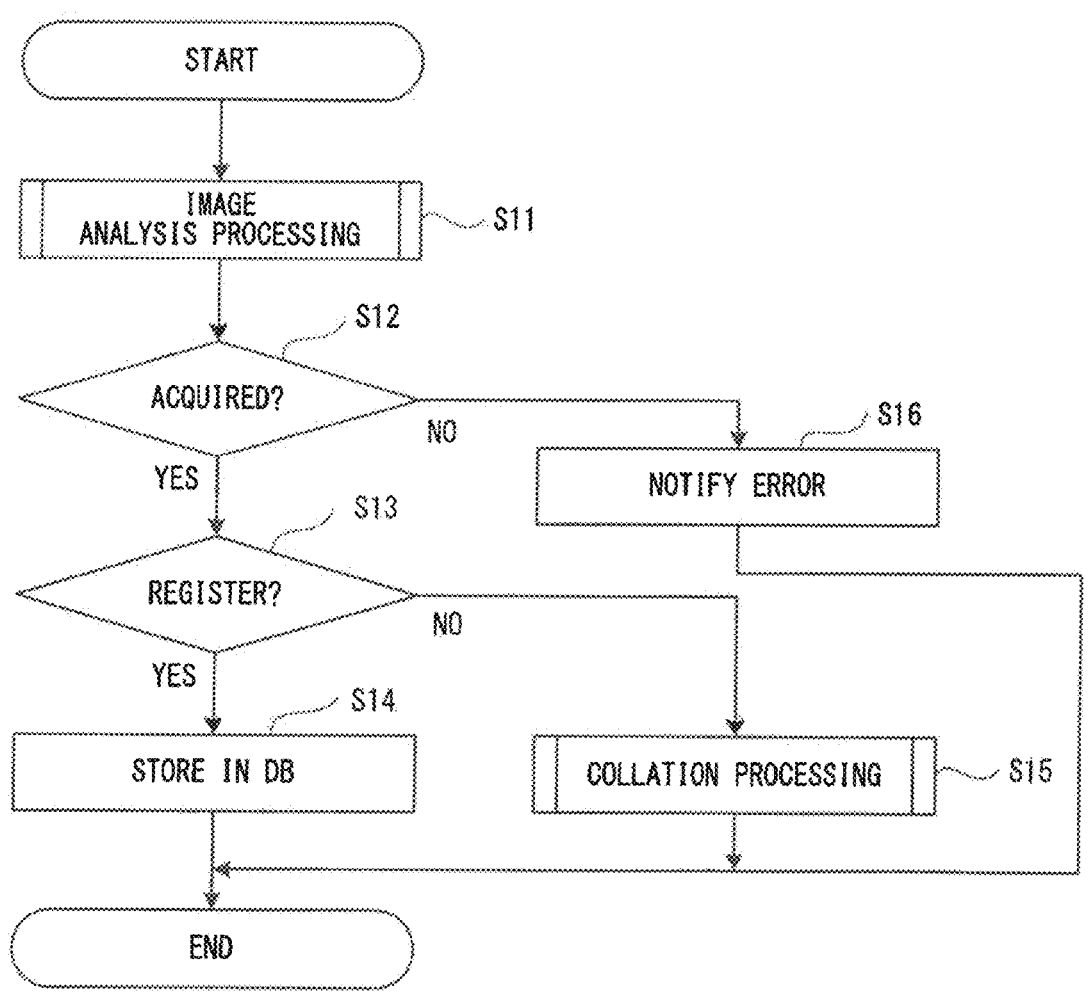
FIG. 5 is a flowchart of collation information processing.

As shown in FIG. 5, the CPU 1 performs image analysis processing (S11). The image analysis processing will be explained with reference to FIG. 6. When a finger touch is detected, the biometric information acquisition device 8 outputs a signal that can identify a captured image of the fingerprint to the CPU 1. The CPU 1 receives the signal output from the biometric information acquisition device 8. On the basis of the received signal, the CPU 1 acquires the image (S21). For example, an image 41 shown in FIG. 7 is acquired at S21. Two-dimensional coordinates of the image coordinate system shown by Xp and Yp are set in the image 41. The CPU 1 sets a position of a pixel at the upper left of the image 41 as the origin of two-dimensional coordinates 45 of the image coordinate system. A position of a pixel which is separated from the origin of the two-dimensional coordinates 45 by x pixels in the Xp plus direction and which is separated from the origin by y pixels in the Yp plus direction is denoted by coordinates (x, y). The image 41 represents a square imaging range that is 1 centimeter on each side, and is a square image of 192 pixels in the Xp direction (the left-right direction) and 192 pixels in the Yp direction (the up-down direction).

The CPU 1 extracts the feature points from the image acquired at S21 (S22). In accordance with the known method (refer to Japanese Patent No. 1289457, for example), the CPU 1 of the present example extracts a point representing an endpoint of a ridge, and a point representing a branch point, respectively, as the feature points. The ridge is a continuous strip of a convex portion of the fingerprint. The endpoint is a dead end of the ridge. The branch point is a point at which one ridge divides into two. As shown in FIG. 7, a plurality of the feature points including an endpoint surrounded by a circle 46 are extracted from the image 41. The CPU 1 determines whether or not the feature points have been extracted by the processing at S22 (S23). When the feature points have not been extracted (no at S23), the CPU 1 ends the image analysis processing and returns the processing to the collation information processing in FIG. 5. When the feature points have been extracted (yes at S23), the CPU 1 determines the feature points extracted at S22 as the base points (S27). From among the base points determined at S27, the CPU 1 acquires one of the base points on which processing at S28 has not been performed, and acquires coordinates (two-dimensional coordinates of the image coordinate system) and the direction of the acquired one base point (S28). The direction of the base point of the present example is a direction angle of the ridge at the base point. More specifically, when the base point is a point representing the endpoint of the ridge, the direction of the base point is the direction of a tangent line of the ridge that passes through the endpoint. When the base point is a point representing the branch point, the CPU 1 selects two tangent lines that form a minimum angle, among angles formed by tangent lines of three ridges forming the branch point, and sets an intermediate direction between the directions of the two tangent lines as the direction of the base point.

Figure 8:
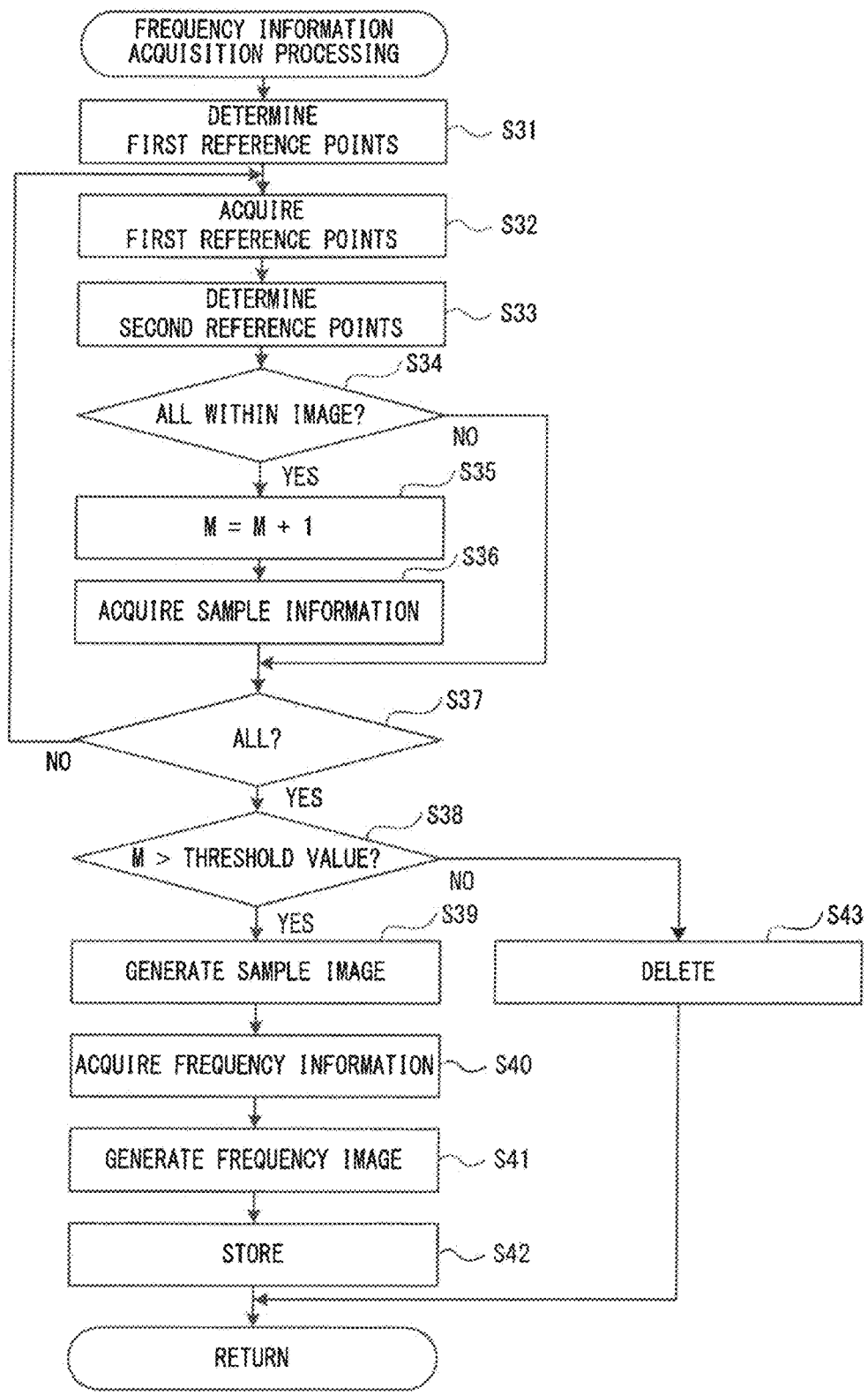
FIG. 8 is a flowchart of frequency information acquisition processing that is performed in the image analysis processing shown in FIG. 6.

The CPU 1 performs frequency information acquisition processing for the base point acquired at S28 (S29). As shown in FIG. 8, in the frequency information acquisition processing, the CPU 1 determines the first reference points for the base point acquired at S28 in FIG. 6 (S31). In the present example, the CPU 1 determines, as the first reference points Qn, 63 points whose distance from the base point P is the first predetermined value L1. In the present example, the first reference point Q1 is a point whose distance from the base point P is the first predetermined value L1 and which is in a predetermined direction in relation to the base point P. The predetermined direction is the direction acquired at S28 in FIG. 6 in relation to the base point P. When the base point P is the point surrounded by the circle 46, the predetermined direction is indicated by an arrow 47. The first reference points Q2 to Q63 are points on the circumference of the circle whose center is the base point P and whose radius is the first predetermined value L1, and are arranged at equal intervals clockwise, in that order, from the first reference point Q1.

From among the plurality of first reference points determined at S31, the CPU 1 acquires one of the first reference points Qn on which processing at S32 has not been performed (S32). The CPU 1 determines a plurality of the second reference points Rnm for the first reference point Qn acquired at S32, on the basis of a predetermined condition (S33). In accordance with a position in the image, the CPU 1 of the present example determines, as the second reference points Rnm, 128 points whose distance from the first reference point Qn is the second predetermined value L2. In the two-dimensional coordinates of the image coordinate system, the second reference points Rnm are points that are obtained such that a point to the right of the first reference point Qn is taken as the second reference point Rn1, and the circumference of the circle whose center is the first reference point Qn and whose radius is the second predetermined value L2 is divided clockwise into 128 equal parts. The second reference points Rn2 to Rn128 are arranged clockwise in that order, with the second reference point Rn1 being taken as a starting point. The second predetermined value L2 and the number of the second reference points may be set as appropriate, while taking account of the size of the image, the resolution, an authentication accuracy, a processing speed and the like. It is preferable that the number of the second reference points be set to a power of 2, from the viewpoint of acquiring the frequency information to be described later.

The CPU 1 determines whether or not all the second reference points Rnm determined at S33 are within the image (S34). When it is not determined that all the second reference points Rnm are within the image (no at S34), the CPU 1 performs processing at S37 to be described later. When all the second reference points Rnm are within the image (yes at S34), the CPU 1 increments a variable M by 1 (S35). An initial value of the variable M is 1. The CPU 1 acquires the sample data (S36). The CPU 1 acquires a sample, which is formed by the position information and the color information, for each of the plurality of second reference points Rnm determined at S33. The CPU 1 of the present example acquires, as the color information, gray-scale values of pixels represented by the second reference points. When the coordinates of the second reference points are in units of sub-pixels (when absolute coordinates are not integers), the CPU 1 uses a known bilinear interpolation method to calculate the color information of the second reference points using gray-scale values of four pixels in the vicinity of each of the second reference points. The CPU 1 generates the sample data by associating the acquired plurality of samples with the center information of the first reference points Qn.

Figure 9:
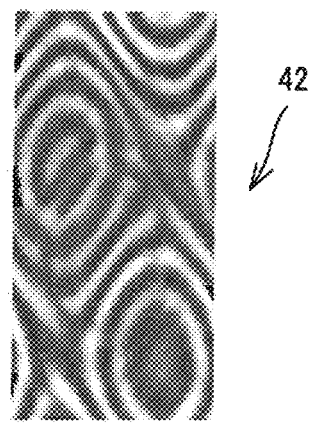
FIG. 9 is a sample image generated on the basis of an image 41 shown in FIG. 7.
Figure 10:
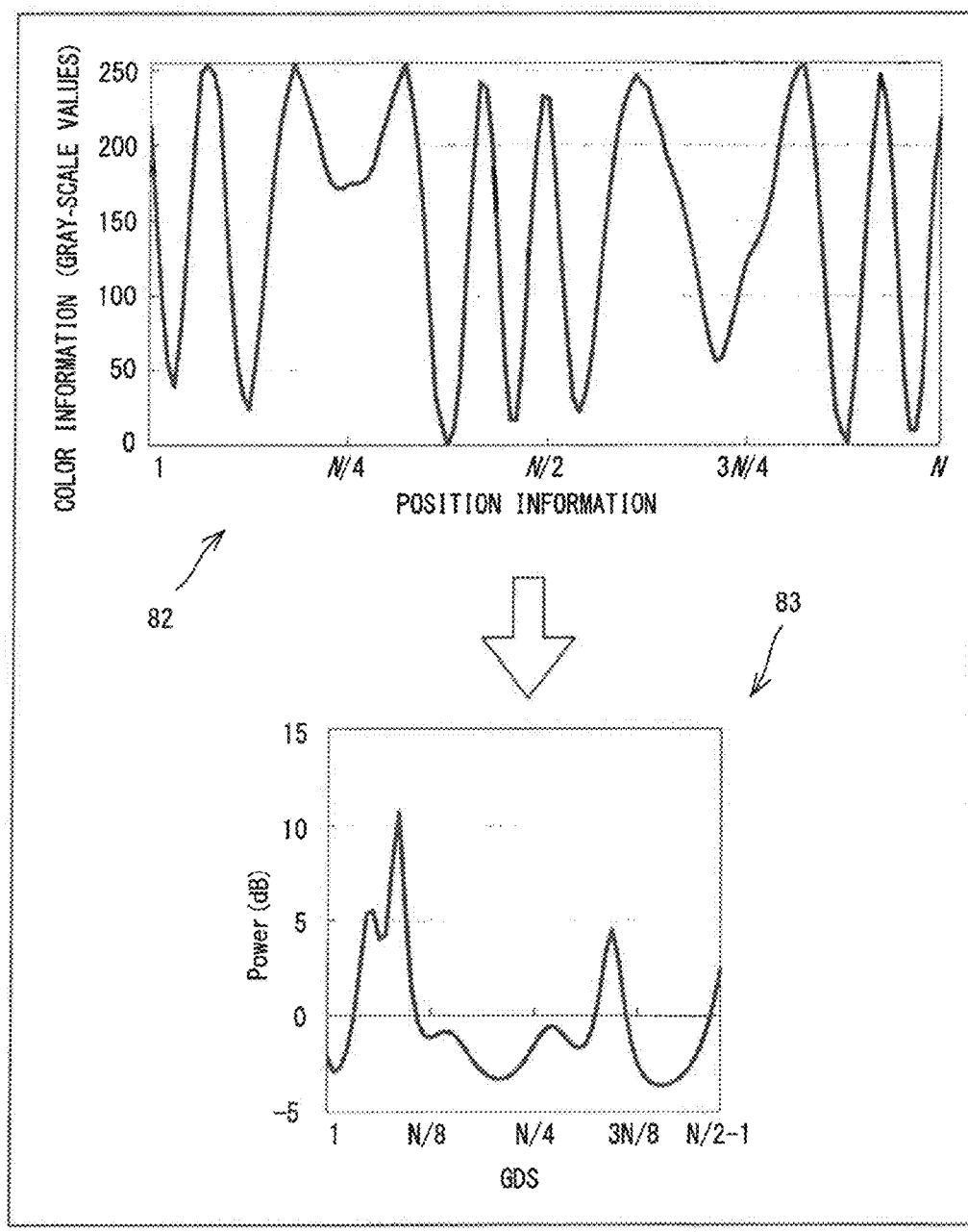
FIG. 10 is an explanatory diagram of a process that calculates frequency components on the basis of a change of color information with respect to position information, which is represented by sample data.

The CPU 1 determines whether or not the processing at S32 has been performed for all the first reference points Qn determined at S31 (S37). When the processing at S32 has not been performed for all the first reference points (no at S37), the CPU 1 returns the processing to S32. When the processing at S32 has been performed for all the first reference points Qn (yes at S37), the CPU 1 determines whether or not the variable M is larger than a threshold value (838). The processing at S38 is processing to determine whether or not the sample information is valid. When the variable M is larger than the threshold value (yes at S38), the CPU 1 generates a sample image on the basis of the sample information formed by the plurality of sample data acquired at S36 (S39). At S39, a sample image 42 shown in FIG. 9 is generated for the base point P shown by the circle 46 of the image 41 shown in FIG. 7. The short side direction of the sample image 42 corresponds to the center information and the long side direction corresponds to the position information. The color of each of the pixels of the sample image 42 represents the color information of the pixels corresponding to the combination of the center information and the position information.

The CPU 1 acquires the frequency information on the basis of the sample information formed by the sample data acquired at S36 (S40). In accordance with the aforementioned known method, the CPU 1 of the present example calculates, as the frequency information, the one-dimensional group delay spectrum of changes in the color information with respect to the position information, for each piece of the center information. The group delay spectrum (GDS) is defined as the frequency derivative of a phase spectrum in a power transfer function. As exemplified in FIG. 10, a GDS 83 calculated on the bases of sample information 82 separates and emphasizes individual peaks of the frequency spectrum of the sample information 82. The number of elements of the arrangement of the GDS is the number obtained by subtracting 1 from the number of elements of the phase spectrum. Specifically, the CPU 1 calculates the GDS using the phase derivative of a power spectrum obtained by performing a high-speed Fourier transform on a weighted LPC coefficient, and takes the calculated GDS as the frequency components.

Figure 11:
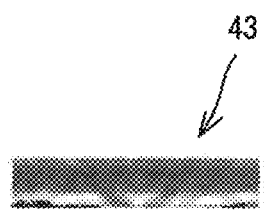
FIG. 11 is a frequency image generated on the basis of an image 41 shown in FIG. 7.

The CPU 1 generates a frequency image on the basis of the frequency information acquired at S40 (S41). In a specific example, a frequency image 43 shown in FIG. 11 is generated. In the specific example, the short side direction of the frequency image 43 corresponds to the number of elements, and the long side direction corresponds to the center information. Colors of the pixels of the frequency image 43 represent the GDS of the pixels corresponding to the combination of the number of elements and the center information. The CPU 1 darkens (increases the gray-scale values of) the pixels for which the GDS is relatively large. The CPU 1 lightens (decreases the gray-scale values of) the pixels for which the GDS is relatively small.

The CPU 1 stores the collation information including the frequency information acquired at S40 (S42). The CPU 1 of the present example stores the coordinates of the base point, the direction of the base point and the frequency information, as the collation information. When the variable M is not larger than the threshold value at S38 (no at S38), the CPU 1 deletes the sample information formed by the sample data acquired at S36 (S43). After S42 or S43, the CPU 1 ends the frequency information acquisition processing and returns the processing to the image analysis processing in FIG. 6. After S29 in FIG. 6, the CPU 1 determines whether or not the processing at S28 has been performed for all the base points determined at S27 (S30). When it is not determined that the processing at S28 has been performed for all the base points (no at S30), the CPU 1 returns the processing to S28. When the processing at S28 has been performed for all the base points (yes at S30), the CPU 1 ends the image analysis processing and returns the processing to the collation information processing in FIG. 5.

After S11, the CPU 1 determines whether or not the collation information including the frequency information has been acquired at S11 (S12). When the collation information has not been acquired (no at S12), the CPU 1 performs error notification (S16). For example, the CPU 1 displays an error message on the display portion 6. When the collation information has been acquired (yes at S12), it is determined whether to register, in the DB 28 (refer to FIG. 2), the collation information acquired at S11 as the reference collation information (S13). Information indicating whether or not to register is included in the start command, for example. In the specific example, it is determined that the collation information is to be registered in the DB 28 (yes at S13), and the CPU 1 stores the collation information acquired at S11 in the DB 28 of the flash memory 4 (S14). When it is determined that the collation information is not to be registered in the DB 28 (no at S13), the CPU 1 performs the collation processing in which the collation information acquired at S11 is taken as the test collation information, which is a collation target (S15). After one of S14, S15 and S16, the CPU 1 ends the collation information processing.

2. Processing at Time of Collation

Figure 12:
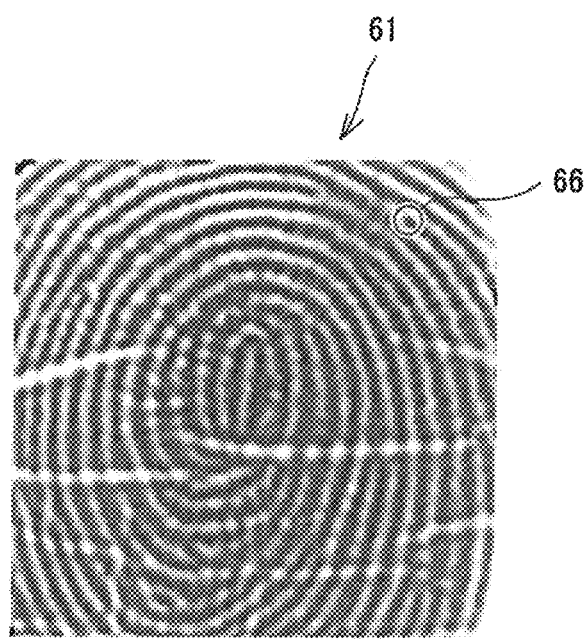
FIG. 12 is an image representing test biometric information acquired from a biometric information acquisition device 8.
Figure 13:
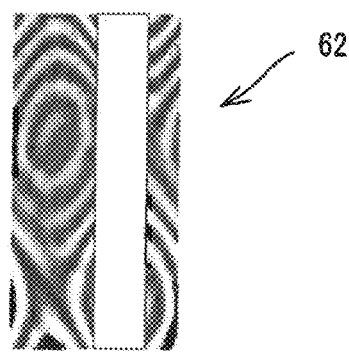
FIG. 13 is a sample image generated on the basis of an image 61 shown in FIG. 12.
Figure 14:
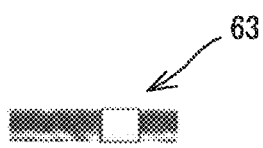
FIG. 14 is a frequency image generated on the basis of an image 61 shown in FIG. 12.

The collation information processing at the time of collation will be explained taking an example in which the frequency information extracted from the image 41 shown in FIG. 7 is used as reference frequency information, and an image 61 shown in FIG. 12 is acquired as a test image, which is a collation target. In the collation information processing at the time of collation, S11 is performed in the same manner as in the collation information processing at the time of registration. For example, when an endpoint surrounded by a circle 66 in FIG. 12 is acquired as the feature point at S22 in FIG. 6, a sample image 62 shown in FIG. 13 is generated at S39 in FIG. 8. The sample image 62 has a section, which is shown as a blank space, for which the sample data is missing since the sample data is not acquired for the second reference points Rnm for which it is not determined, at S34 in FIG. 8, that all of them are within the image (no at S34). At S41 in FIG. 8, a frequency image 63 shown in FIG. 14 is generated. FIG. 14 has a section, which is shown as a blank space, for which the frequency components are missing.

At S12 in FIG. 5, it is determined that the collation information has been acquired (yes at S12), and it is determined that the collation information is not to be registered based on the start command (no at S13). The CPU 1 performs the collation processing (S15). In the collation processing, the CPU 1 calculates a similarity degree W between the reference frequency information and test frequency information, for combinations of the base points that satisfy the predetermined condition. On the basis of the similarity degree W, the CPU 1 determines a correspondence between the base points acquired from the reference image and the base points acquired from the test image. In accordance with the determined correspondence, the CPU 1 calculates a collation score and performs authentication.

Figure 15:
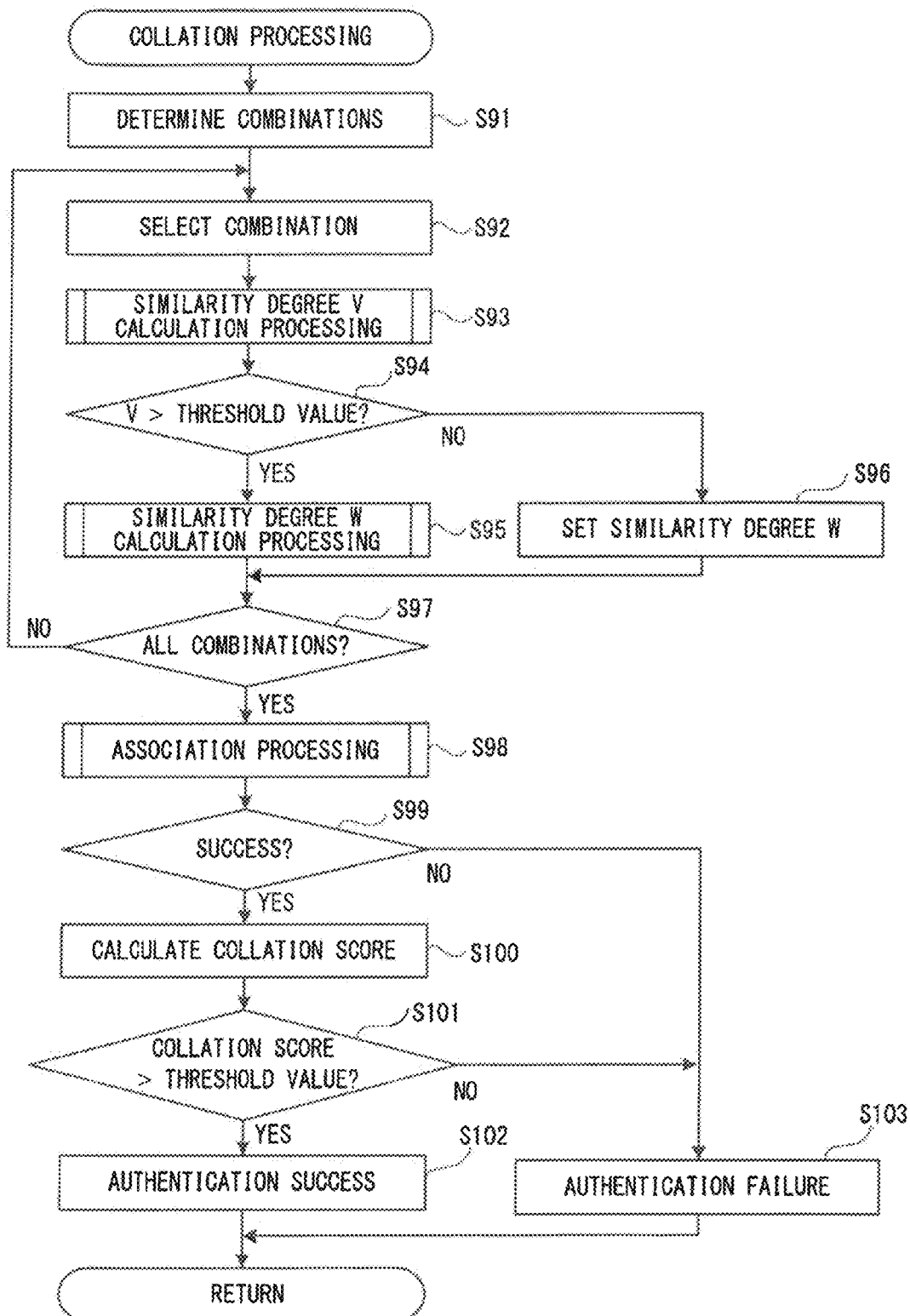
FIG. 15 is a flowchart of collation processing that is performed in the collation information processing shown in FIG. 5.
Figure 16:
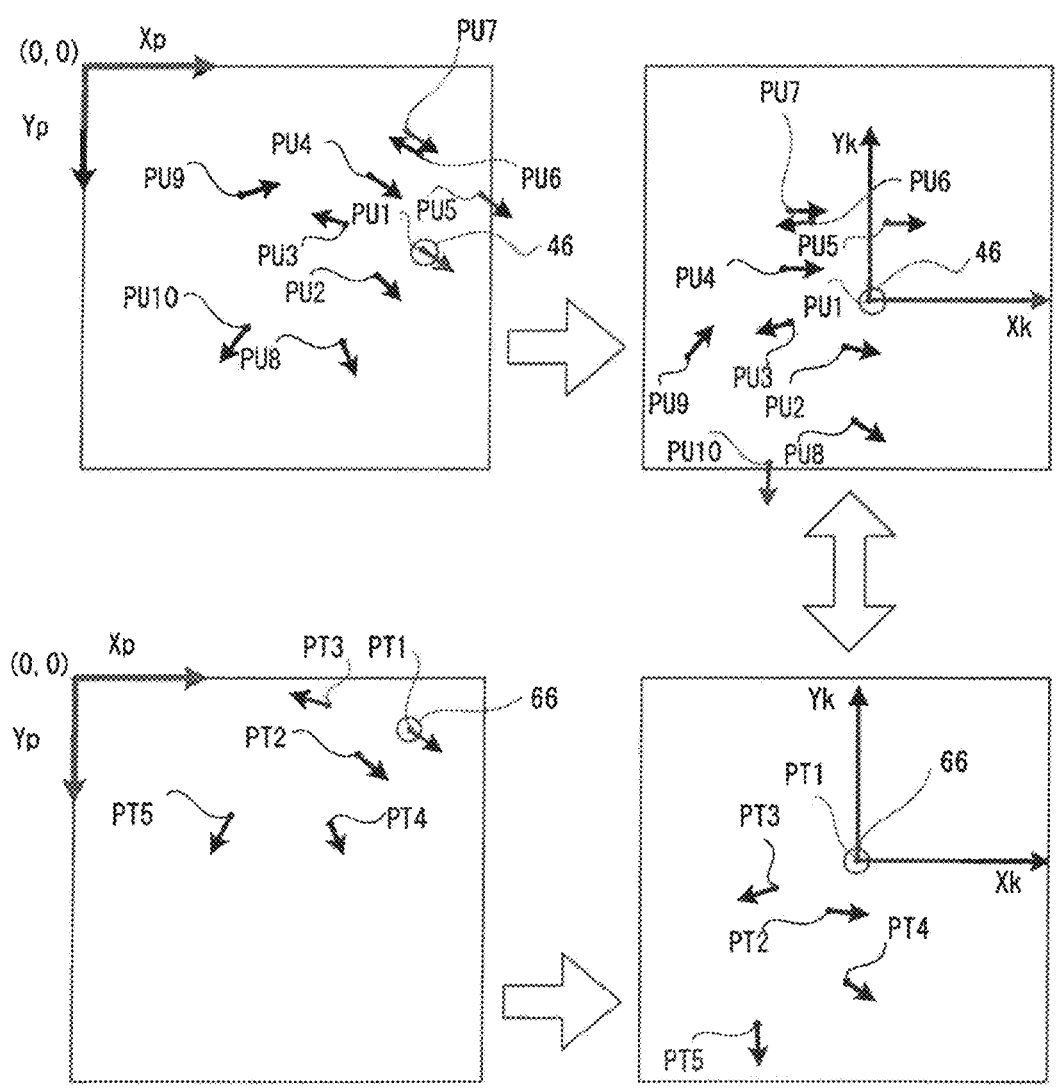
FIG. 16 is an explanatory diagram of processing that sets a local coordinate system, respectively, for base points PU acquired from the reference image 41 and base points PT calculated from the test image 61.

As shown in FIG. 15, in the collation processing, the CPU 1 determines all the combinations between base points PT acquired from the test image and base points PU acquired from the reference image (S91). When ten base points PU1 to PU10 in FIG. 16 are acquired from the reference image 41 shown in FIG. 7 and five base points PT1 to PT5 in FIG. 16 are acquired from the test image 61 shown in FIG. 12, fifty combinations are determined at S91. At S92, the CPU 1 selects one of the combinations that has not been selected, from among the combinations determined at S91 (S92). The CPU 1 calculates a similarity degree V between the base point PT and the base point PU of the combination selected at S92 (S93). For each of the base point PT and the base point PU, on the basis of coordinates of a predetermined number of the base points in the vicinity of the base point and the direction of the base point (the feature point), the CPU 1 calculates the similarity degree V.

Figure 17:
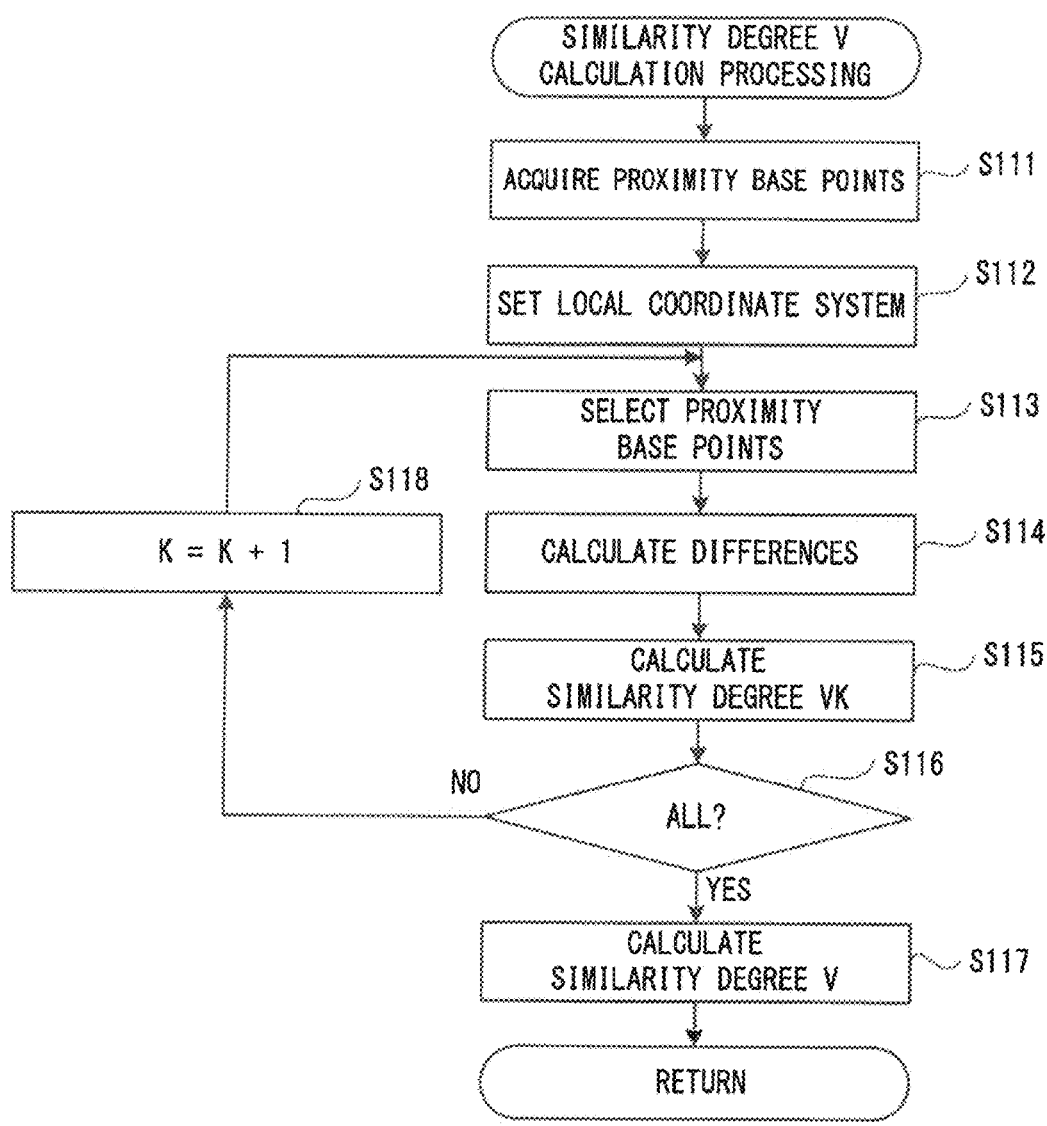
FIG. 17 is a flowchart of similarity degree V calculation processing that is performed in the collation processing shown in FIG. 15.

As shown in FIG. 17, in the similarity degree V calculation processing, the CPU 1 acquires proximity base points for each of the selected base points, which are the base points selected at S92 in FIG. 15 (S111). The proximity base points are the predetermined number of base points that are extracted in an order of shorter distance from each of the selected base points, among the plurality of base points acquired from the image. When the predetermined number is four and the combination of the base points selected at S92 is the base point PU1 and the base point PT1, the base points PU2 to PU5 are acquired as the proximity base points PU of the base point PU1. The base points PT2 to PT5 are acquired as the proximity base points PT of the base point PT1. The CPU 1 sets a local coordinate system for the selected base point and the proximity base points (S112). The local coordinate system is a system of relative coordinates that are set based on the coordinates and the direction of the selected base point. Specifically, taking the coordinates of the selected base point as the origin, the CPU 1 sets the direction of the base point (the feature point) acquired for the selected base point as an Xk-axis plus direction. The CPU 1 sets a direction obtained by rotating the Xk-axis counterclockwise by 90 degrees, as a Yk-axis plus direction. The CPU 1 calculates the coordinates of the local coordinate system and the direction of the base point (the feature point), for each of the proximity base points acquired at S111.

The CPU 1 selects a test proximity base point which is the K-th closest in distance to the test selected base point PT1, and a reference proximity base point which is the K-th closest in distance to the reference selected base point PU1 (S113). An initial value of the variable K is 1. When the variable K is 1, the base point PT2 is acquired as the test proximity base point, and the base point PU2 is acquired as the reference proximity base point. The CPU 1 respectively calculates a distance difference CD, an angle difference AD, and a direction distance DD between the test proximity base point and the reference proximity base point selected at S113 (S114). The distance is a distance between the proximity base point and the selected base point. When the local coordinates of the proximity base point are (Xk, Yk), the distance is $\sqrt{(Xk^2+Yk^2)}$. The angle is a clockwise angle from the Xk-axis, and is formed by the Xk-axis of the local coordinate system and a vector from the selected base point toward the proximity base point. The direction is the direction of the proximity base point and is expressed using the local coordinate system. The CPU 1 calculates similarity degrees VK on the basis of the differences CD, AD and DD calculated at S114 (S115). The CPU 1 calculates VK on the basis of Expression (1).

$$VK=Vh-(VC \times CD+VA \times AD+VD \times DD) \quad \text{Expression (1)}$$

In Expression (1), Vh is a predetermined value. VC is a weighting factor of the difference CD. VA is a weighting factor of the difference AD. VD is a weighting factor of the difference DD. Note however that, when one of the differences CD, AD and DD is equal to or more than a threshold value that is individually set, the CPU 1 sets VK to 0.

The CPU 1 determines whether or not all the proximity base points have been selected by the processing at S113 (S116). Since the predetermined number of the present example is four, when the variable K is 4, the CPU 1 determines that all the proximity base points have been selected by the processing at S113. When it is not determined that all the proximity base points have been selected by the processing at S113 (no at S116), the CPU 1 increments the variable K by 1 (S118) and returns the processing to S113. When all the proximity base points have been selected by the processing at S113 (yes at S116), the CPU 1 calculates the similarity degree V (S117). The similarity degree V is the sum of the plurality of similarity degrees VK calculated at S115. Since the predetermined number is four in the present example, the similarity degree V is the sum of the similarity degrees V1 to V4. After S117, the CPU 1 ends the similarity degree V calculation processing and returns the processing to the collation processing in FIG. 15.

After S93, the CPU 1 determines whether or not the similarity degree V calculated at S93 is larger than a threshold value (S94). S94 is processing to calculate the similarity degree W only when the similarity degree V between the reference selected base point and the test selected base point is larger than the threshold value. The similarity degree W is calculated on the basis of the local coordinates and the direction of the proximity base points. In comparison to the similarity degree V, it takes time to calculate the similarity degree W. Therefore, taking efficiency of the processing into consideration, the processing at S93 and S94 is performed in the present example. When the similarity degree V is not larger than the threshold value (no at S94), the CPU 1 sets a predetermined value as the similarity degree W (S96). The predetermined value is 0, for example. When the similarity degree V is larger than the threshold value (yes at S94), the CPU 1 performs the similarity degree W calculation processing (S95).

Figure 18:
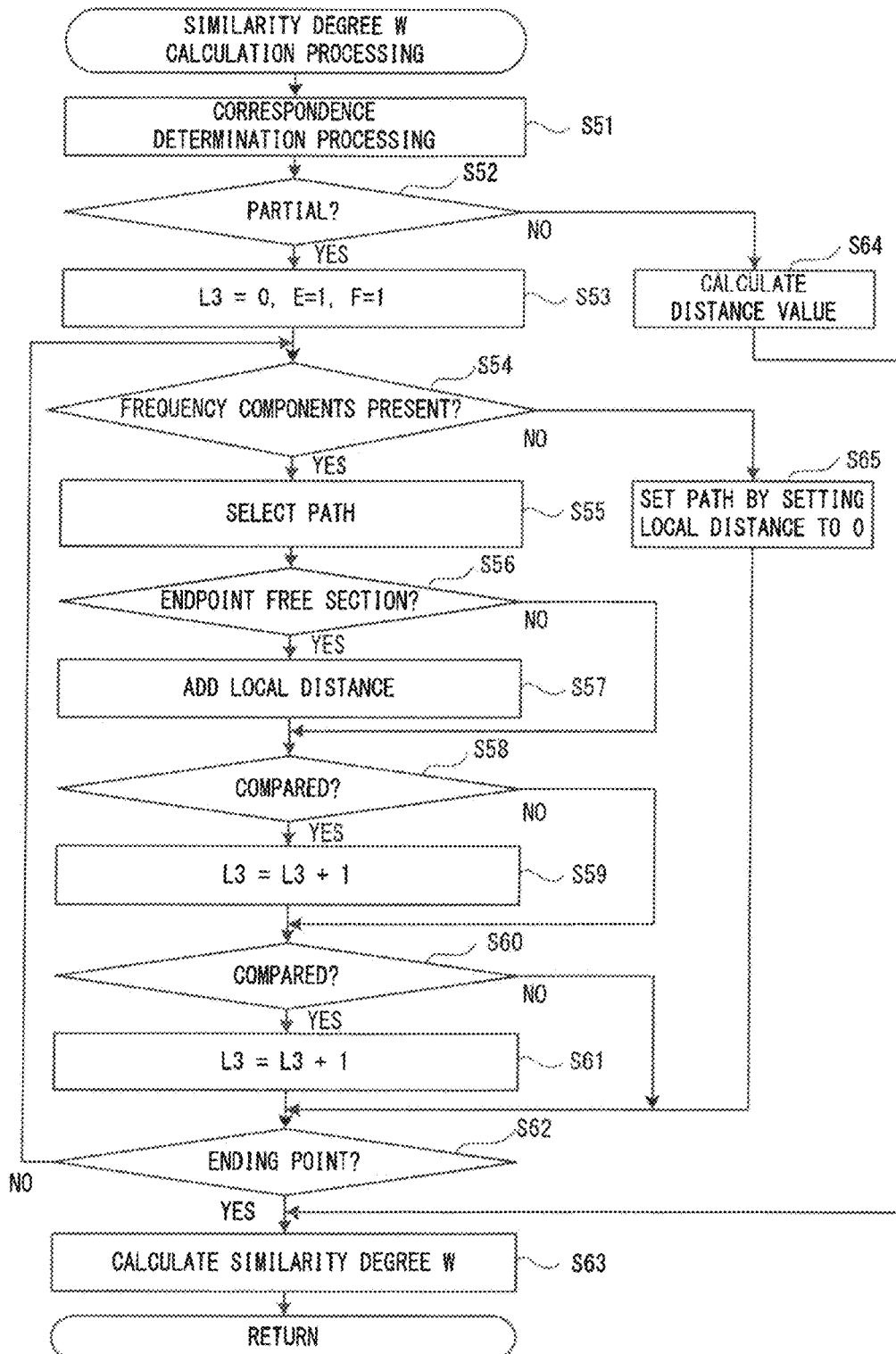
FIG. 18 is a flowchart of similarity degree W calculation processing that is performed in the collation processing shown in FIG. 15.
Figure 19:
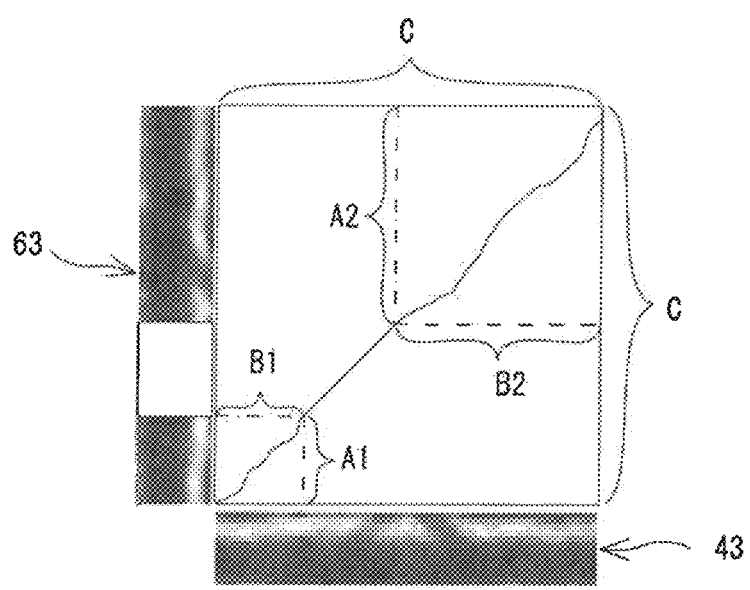
FIG. 19 is a diagram illustrating a process of calculating the similarity degree W using a frequency image 43 and a frequency image 63.

The CPU 1 of the present example calculates the similarity degree W using endpoint free DP matching. As shown in FIG. 18, in the similarity degree W calculation processing, the CPU 1 determines correspondence between the reference frequency information and the test frequency information (S51). In the collation information processing of the first embodiment, the CPU 1 uses the direction of the base point (the feature point) to determine the order of acquisition of the first reference points. In other words, the center information is associated in advance with the reference frequency information and the test frequency information using the direction of the base point. The correspondence between the reference frequency information and the test frequency information is shown in FIG. 19. In FIG. 19, the test frequency image 63 is shown on the left side. The reference frequency image 43 is shown on the lower side. The frequency image 63 in FIG. 19 is obtained by rotating the frequency image 63 in FIG. 14 counterclockwise by 90 degrees around the lower left point of the frequency image 63 in FIG. 14. The frequency image 43 in FIG. 19 is obtained by inverting the frequency image 43 in FIG. 11 with respect to the lower side of the frequency image 43 in FIG. 11.

The CPU 1 determines whether or not at least one of the reference frequency information and the test frequency information is partial (S52). Specifically, the CPU 1 determines whether or not there is the center information that does not contain the frequency components in at least one of the reference frequency information and the test frequency information. When there is the center information that does not contain the frequency components, it is determined to be partial. When it is determined that both the reference frequency information and the test frequency information are not partial (no at 852), the CPU 1 calculates a distance value D between the reference frequency information and the test frequency information using a known method (S64). The known method is, for example, the endpoint free DP matching method. In the specific example shown in FIG. 19, it is determined that one of the reference frequency information and the test frequency information is partial (yes at 852), and the CPU 1 sets a variable L3 to 0 (S53). The CPU 1 sets a variable E and a variable F to 1 (S53).

Figure 20:
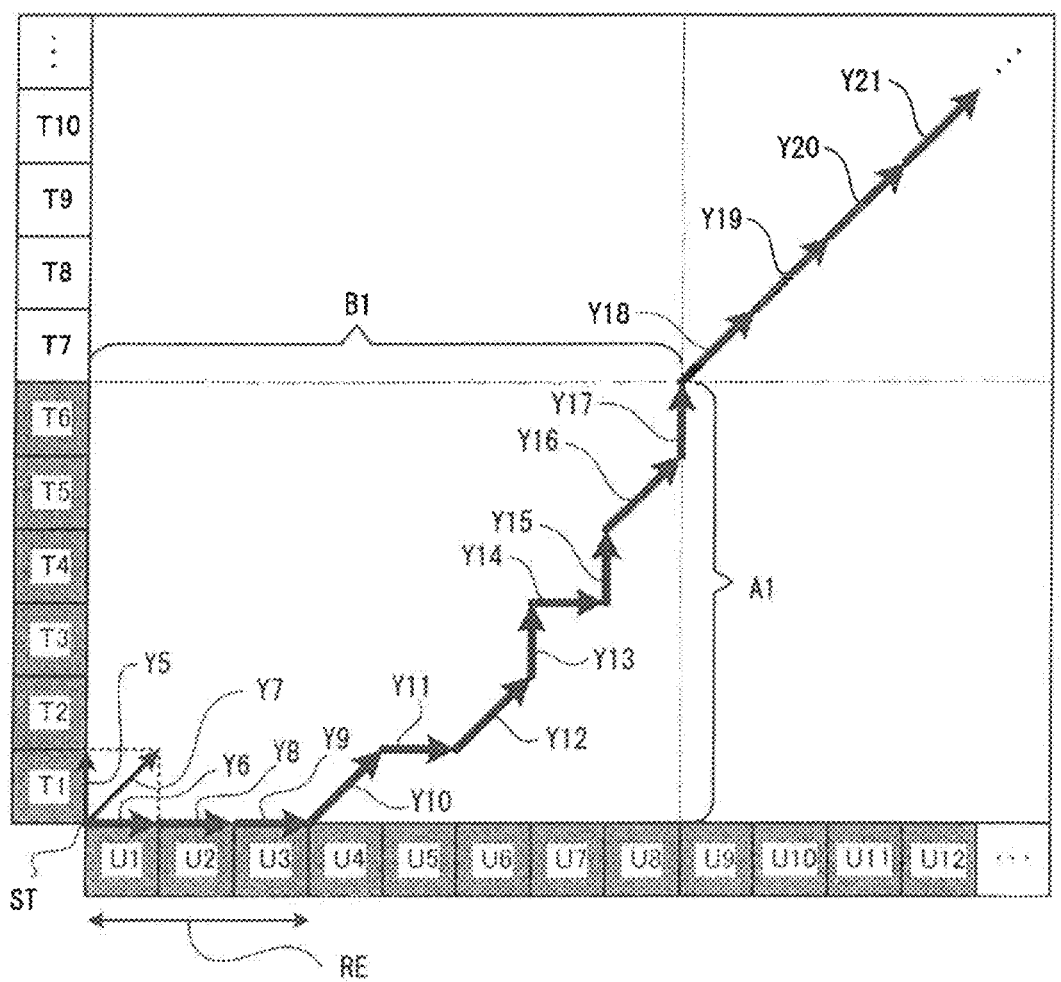
FIG. 20 is an explanatory diagram schematically showing the process of calculating the similarity degree W.

The CPU 1 determines whether or not a reference frequency component UE whose center information is E and a test frequency component TF whose center information is F are both present (S54). Using blocks, FIG. 20 schematically shows the reference frequency component UE whose center information is E and the test frequency component TF whose center information is F. In FIG. 20, hatching is applied to the blocks of the reference frequency components UE or the test frequency components TF corresponding to the first reference points (more specifically, the first reference points having frequency components) for which the sample information was acquired at S36 in FIG. 8. The hatching is not applied to the blocks (which are white) of the reference frequency components UE or the test frequency components TF corresponding to the first reference points for which S36 was not performed. Reference frequency components U1 to U12 and test frequency components TI to T6 respectively have frequency components. Test frequency components T7 to T10 do not have frequency components. When both of them are present (yes at S54), the CPU 1 selects a path with a minimum matching cost (S55). The CPU 1 selects a path with a smallest distance, from among a distance L5 between the reference frequency component UE and the test frequency component T(F+1), a distance L6 between the reference frequency component U(E+1) and the test frequency component TF, and a distance L7 between the reference frequency component U(E+1) and the test frequency component T(F+1).

In a case where the variable E and the variable F shown on the lower left side of FIG. 20 are each 1, when the distance L5 is the smallest, the CPU 1 increments the variable F by 1 and selects a path shown by an arrow Y5. When the distance L6 is the smallest, the CPU 1 increments the variable E by 1 and selects a path shown by an arrow Y6. When the distance L7 is the smallest, the CPU 1 increments each of the variable E and the variable F by 1 and selects a path shown by an arrow Y7. In the present example, the distance L6 is the smallest and the path shown by the arrow Y6 is selected.

The CPU 1 determines whether or not the path selected at S55 is a path of an endpoint free section (S56). When the whole of the path from a path search start position (the lower left position shown by a point ST in FIG. 20) is the path in the direction shown by the arrow Y5, or when the whole of the path from the path search start position is the path in the direction shown by the arrow Y6, the CPU 1 determines that the path selected at S55 is the path of the endpoint free section. Note however, that it is determined to be the endpoint free section only when the path in the same direction only is selected a predetermined number of times (four times, for example) or less. In the example shown in FIG. 20, with respect to the paths shown by the arrows Y6, Y8 and Y9, the whole of the path from the path search start position is a path in the direction (the rightward direction in the drawing) shown by the arrow Y6, and the path in the same direction only is selected the predetermined number of times, i.e., 4 times, or less. Therefore, the paths are determined to be the endpoint free section. The endpoint free section is shown by an arrow RE. Subsequent paths are not determined to be paths in the endpoint free section even when the paths in the direction shown by the arrow Y6 are continuous. In the case of the endpoint free section (yes at S56), the CPU 1 updates the distance D by adding a local distance to the distance value D (S57). An initial value of the distance value D is 0. The local distance is the smallest distance among the three distances calculated at S55.

When the path selected at S55 is not the path of the endpoint free section (no at S56), or after S57, the CPU 1 determines whether or not the frequency components have been newly compared in the test frequency information (S58). When the distance L5 between the reference frequency component UE and the test frequency component T(F+1) is the smallest at S55, the CPU 1 determines that the frequency components have been newly compared in the test frequency information (yes at S58). FIG. 20 shows a case in which paths respectively shown by arrows Y13, Y15 and Y17 are selected. Also when the distance L7 between the reference frequency component U(E+1) and the test frequency component T(F+1) is the smallest at S55, the CPU 1 determines that the frequency components have been newly compared in the test frequency information (yes at S58). FIG. 20 shows a case in which paths respectively shown by arrows Y10, Y12 and Y16 are selected. When it is determined that the frequency components have been newly compared in the test frequency information (yes at S58), the CPU 1 increments the variable L3 by 1 (S59).

When the frequency components have not been newly compared in the test frequency information (no at S58), or after the processing at S59, it is determined whether or not the frequency components have been newly compared in the reference frequency information (S60). When the distance L6 between the reference frequency component U(E+1) and the test frequency component TF is the smallest at S55, the CPU 1 determines that the frequency components have been newly compared in the reference frequency information (yes at S60). FIG. 20 shows a case in which the paths respectively shown by the arrows Y6, Y8, Y9, Y11 and Y14 are selected.

Also when the distance L7 between the reference frequency component U(E+1) and the test frequency component T(F+1) is the smallest at S55, the CPU 1 determines that the frequency components have been newly compared in the reference frequency information (yes at S60). When the frequency components have been newly compared in the reference frequency information (yes at S60), the CPU 1 increments the variable L3 by 1 (S61). Through the processing at S59 and the processing at S61, the sum of A1, B1, A2 and B2 in FIG. 19 is calculated as the variable L3. A1 and A2 represent a range of the test frequency components TF that have been compared with the reference frequency components UE. B1 and B2 represent a range of the reference frequency components UE that have been compared with the test frequency components TF.

After the path shown by the arrow Y17 in FIG. 20 is selected, the CPU 1 determines at S54 that the test frequency component T7 whose center information is 7 is not present. In other words, it is not determined that the reference frequency component UE whose center information is E and the test frequency component TF whose center information is F are both present (no at S54). In this case, the CPU 1 sets the local distance to 0 and sets the path (S65). The CPU 1 sets the path of the reference frequency component U(E+1) and the test frequency component T(F+1), which is shown by an arrow Y18 (S65). When the test frequency components T8 to T10 are selected at S65 that is repeatedly performed, the CPU 1 sets paths of the reference frequency component U(E+1) and the test frequency component T(F+1) that are respectively shown by arrows Y19 to Y21 (S65).

When the frequency components have not been newly compared in the reference frequency information (no at S60), after S61 or S65, the CPU 1 determines whether or not a path to an ending point has been selected (S62). When the variable E and the variable F are a maximum value of the center information, the CPU 1 of the present example determines that it is the ending point. When the path to the ending point has not been selected (no at S62), the CPU 1 returns the processing to S54. When the path to the ending point has been selected (yes at S62), or after the processing at S64, the CPU 1 calculates the similarity degree W on the basis of the variable L3 and the distance value D (S63). The similarity degree W is calculated on the basis of Expression (2) below.

$$W = Ws \times (Dth - D)/Dth \times (L3/2C)^Z \qquad \text{Expression (2)}$$

In Expression (2), Ws is a weighting factor with respect to a predetermined frequency component. Dth is a threshold value of the distance value. As exemplified in FIG. 19, C is a value corresponding to the number of frequency components that can be compared when the not partial determination is made at S52. Z is a weighting factor. At S63 that is performed subsequent to the processing at S64, the CPU 1 sets the variable L3 to a fixed value. The fixed value of the present example is 2C. In accordance with Expression (2), W is set to 0 when the similarity degree W is less than 0. The similarity degree W calculated at S63 is used, for example, in processing that determines a correspondence between the test image 61 and the reference image 41. More specifically, the processing that determines the correspondence between the test image 61 and the reference image 41 is processing that determines the correspondence between the reference image 41 and the test image 61 while taking account of position and angle displacement. After the processing at S63, the CPU 1 ends the similarity degree W calculation processing and returns the processing to the collation processing in FIG. 15.

After S95 or S96, the CPU 1 determines whether or not the processing at S92 has been performed for all the combinations determined at S91 (S97). When it is not determined that the processing at S92 has been performed for all the combinations (no at S97), the CPU 1 returns the processing to S92. When the processing at S92 has been performed for all the combinations (yes at S97), the CPU 1 performs association processing (S98). In the association processing, the CPU 1 determines a correspondence between the base points acquired from the test image and the base points acquired from the reference image, on the basis of the similarity degree W that is calculated or set at S95 and S96.

Figure 21:
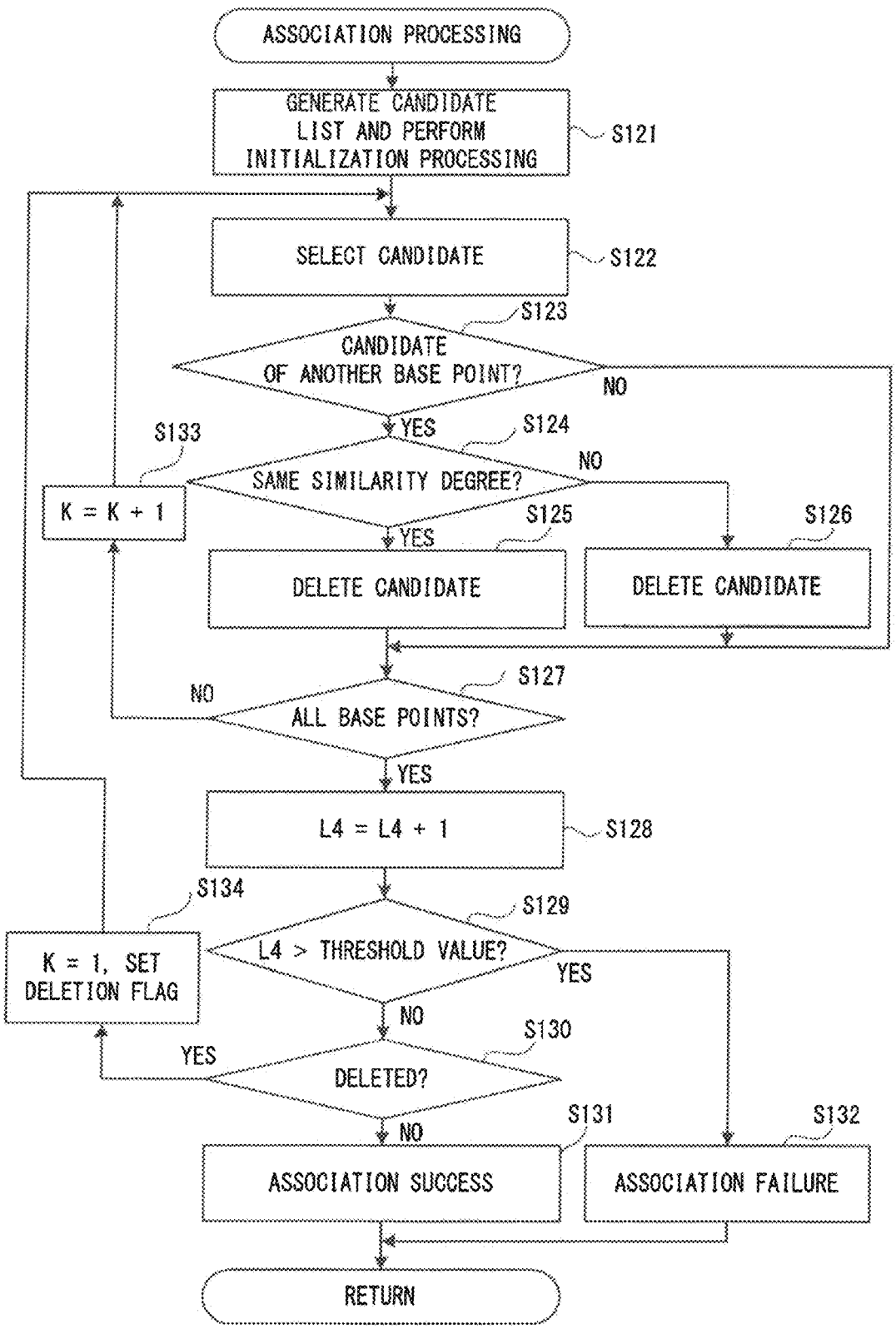
FIG. 21 is a flowchart of association processing that is performed in the collation processing shown in FIG. 15.

As shown in FIG. 21, in the association processing, the CPU 1 generates a candidate list (S121). As shown in FIG. 22, a candidate list 85 is a table in which candidates of the base points PU acquired from the reference image 41 corresponding to the base points PT acquired from the test image 61 are sorted and arranged in a descending order of the similarity degree W. The CPU 1 of the present example includes, in the candidate list, only combinations for which the similarity degree is a predetermined value or more. For example, with respect to the base point PT1, the similarity degree W is higher in the order of the base points PU1, PU5 and PU3, and it is indicated that the base point PU1 is the strongest candidate corresponding to the base point PT1. The CPU 1 sets the variable K to 1, and sets a deletion flag to FALSE.

The CPU 1 selects a candidate for the K-th test base point PT (S122). The initial value of K is 1. When K is 1, PU1, whose similarity degree W with respect to the base point PT1 is the largest, is selected as the candidate for the base point PT1. The CPU 1 determines whether or not the candidate selected at S122 is taken as a candidate for another of the base points PT (S123). The base point PU1 is also a candidate for the other base point PT2 (yes at S123). The CPU 1 determines whether or not a similarity degree W1 is the same as a similarity degree W2 (S124). The similarity degree W1 is the similarity degree W between the base point PT1 and the base point PU1 that is the candidate. The similarity degree W2 is the similarity degree W between the base point PU1 that is the candidate and the other base point PT2. The similarity degree W1 is 80 and the similarity degree W2 is 60, and they are not the same (no at S124). Therefore, the CPU 1 deletes, from the candidate list 85, data 86 of the base point PU1 that is the candidate for the other base point PT2, which is the base point whose similarity degree is the smaller of the similarity degree W1 and the similarity degree W2 (S126). The CPU 1 sets the deletion flag to TRUE. When the similarity degree W1 is the same as the similarity degree W2 (yes at S124), the CPU 1 deletes, from the candidate list 85, the candidate, for one of the K-th test base point PT and the other base point PT having the same first candidate, for which a difference between the similarity degree with the first candidate and the similarity degree with the second candidate is smaller (S125). For example, in a specific example not shown in the drawings, for the K-th test base point PT, when the similarity degree with the first candidate is 80 and the similarity degree with the second candidate is 20, the difference is 60. For the other base point PT having the same first candidate, when the similarity degree with the first candidate is 80 and the similarity degree with the second candidate is 30, the difference is 50. In this case, the CPU 1 deletes, from the candidate list 85, data of the base point PU that is the first candidate for the other base point PT, for which the difference is smaller in comparison to the K-th base point PT. The CPU 1 sets the deletion flag to TRUE.

When the candidate selected at S122 is not a candidate for another of the base points PT (no at S123), or after one of S125 and S126, the CPU 1 determines whether or not the processing at S122 has been performed for all the test base points PT (S127). In the present example, the number of the base points PT is 5. Therefore, when the variable K is 5, the CPU 1 determines that the processing at S122 has been performed for all the test base points PT (yes at S127). When it is not determined that the processing at S122 has been performed for all the base points PT (no at S127), the CPU 1 increments the variable K by 1 (S133), and returns the processing to S122. When the processing at S122 has been performed for all the base points PT (yes at S127), the CPU 1 increments a variable L4 by 1 (S128). An initial value of the variable L4 is 0. The variable L4 is a variable to count the number of times that the processing at S128 is performed. The CPU 1 determines whether or not the variable 4 is larger than a threshold value (S129). When the variable L4 is larger than the threshold value (yes at S129), the CPU 1 sets an association failure (S132). When the variable L4 is not larger than the threshold value (no at S129), the CPU 1 determines whether or not the deletion flag is TRUE (S130).

When the deletion flag is TRUE (yes at S130), the CPU 1 sets the variable K to 1 and sets the deletion flag to FALSE (S134). The CPU 1 returns the processing to S122. When the deletion flag is not TRUE (no at S130), the CPU 1 sets an association success (S131). After S131 or S132, the CPU 1 ends the association processing and returns the processing to the collation processing in FIG. 15. In the specific example, the base point PU1 is associated with the base point PT1 by the processing at S98. The base point PU2 is associated with the base point PT2. The base point PU3 is associated with the base point PT3. The base point PU8 is associated with the base point PT4. The base point PU10 is associated with the base point PT5.

The CPU 1 determines whether or not the association is successful at S98 (S99). When the association is not successful (no at S99), the CPU 1 sets failure as an authentication result (S103). When the association is successful (yes at S99), the CPU 1 calculates a collation score (S100). The collation score is, for example, the sum of the similarity degrees W or the average of the similarity degrees W, in the association set at S98. In a specific example, the average value of a similarity degree WR1 between the base point PT1 and the base point PU1, a similarity degree WR2 between the base point PT2 and the base point PU2, a similarity degree WR3 between the base point PT3 and the base point PU3, a similarity degree WR4 between the base point PT4 and the base point PU8, and a similarity degree WR5 between the base point PT5 and the base point PU10 is calculated as the collation score. The CPU 1 determines whether or not the collation score calculated at S100 is larger than a threshold value (S101). The threshold value is set in advance in accordance with a collation score calculation method set at S100. When the collation score is larger than the threshold value (yes at S101), the CPU 1 sets success as the authentication result (S102). When the collation score is not larger than the threshold value (no at S101), the CPU 1 sets failure as the authentication result (S103). Although not shown in the drawings, the CPU 1 performs notification of the authentication result, as appropriate. The notification is performed, for example, by displaying the authentication result on the display portion 6. The notification may be performed, for example, by reproducing the authentication result by voice. After S102 or S103, the CPU 1 ends the collation processing and returns the processing to the collation information processing in FIG. 5.

In the collation information processing of the first embodiment, the CPU 1 and the flash memory 4 respectively correspond to a processor and storage portion of the present disclosure. The processing at S21 in FIG. 6 corresponds to the image acquisition step of the present disclosure. The CPU 1 that performs the processing at S21 functions as the image acquisition portion of the present disclosure. The processing at S27 corresponds to the base point determination step of the present disclosure. The CPU 1 that performs the processing at S27 functions as the base point determination portion of the present disclosure. The processing from S31 to S37 in FIG. 8 corresponds to the sample information acquisition step of the present disclosure. The CPU 1 that performs the processing from S31 to S37 functions as the sample information acquisition portion of the present disclosure. The processing at S40 in FIG. 8 corresponds to the frequency information acquisition step of the present disclosure. The CPU 1 that performs the processing at S40 functions as the frequency information acquisition portion of the present disclosure. The processing at S42 in FIG. 8 and the processing at S14 in FIG. 5 correspond to the storage control step of the present disclosure. The CPU 1 that performs the processing at S42 and the processing at S14 functions as the storage control portion of the present disclosure. The processing at S22 in FIG. 6 corresponds to an extraction step of the present disclosure. The processing at S28 corresponds to a direction acquisition step of the present disclosure. The processing at S51 in FIG. 18 corresponds to a correspondence determination step of the present disclosure. The processing at S63 in FIG. 18 corresponds to a similarity degree calculation step of the present disclosure. The processing at S31 in FIG. 8 corresponds to a first setting step of the present disclosure. The processing at S33 corresponds to a second setting step of the present disclosure. The processing at S34 corresponds to a determination step of the present disclosure. The processing at S36 corresponds to an acquisition step of the present disclosure. The processing at S57 corresponds to a first similarity degree calculation step of the present disclosure. The processing at S65 corresponds to a second similarity degree calculation step of the present disclosure. The processing at S63 corresponds to an information similarity degree calculation step of the present disclosure.

The information processing device 10 can generate the frequency information that indicates a change in color of the surrounding area of the base point P in the image. The distance between the base point P and the first reference points Q is the first predetermined value L1. In other words, the first reference points Q are located on the circumference of the circle whose center is the base point P and whose radius is the first predetermined value L1. Therefore, the information processing device 10 can generate the collation information that can cancel out any influence resulting from the rotation or movement, with respect to the base point, of the biometric information represented by the image (the biometric information represented by a fingerprint image in the present example).

The frequency information is calculated on the basis of the feature points extracted from the image. Therefore, even when the number of the feature points extracted from the image is small, the information processing device 10 can generate information that indicates a change in color of the surrounding area of each of the feature points. For example, the frequency information can be used to associate, with each other, the feature points extracted from the test image 61 used for the collation of the biometric information, the feature points extracted from the registration (reference) image 41 stored in the flash memory 4, and the feature points used as reference targets.

Figure 6:
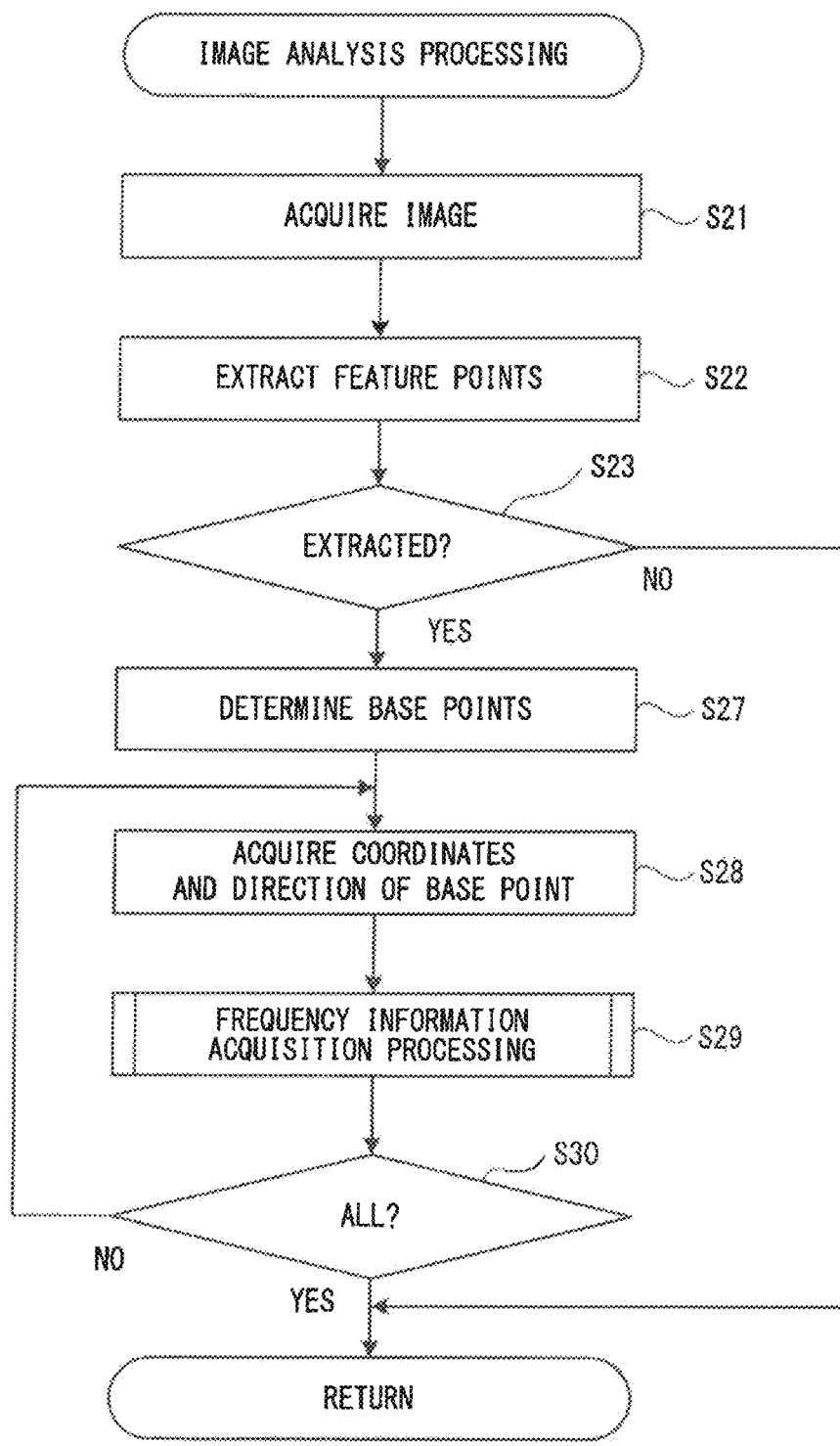
FIG. 6 is a flowchart of image analysis processing that is performed in the collation information processing shown in FIG. 5.
Figure 7:
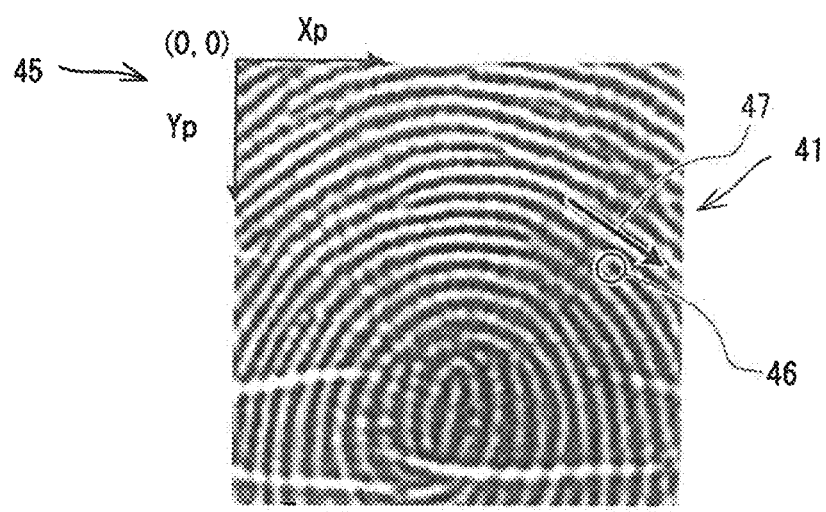
FIG. 7 is an image representing reference biometric information acquired from a biometric information acquisition device 8.

On the basis of the direction of the base point (the feature point) acquired at S28 in FIG. 6, the information processing device 10 acquires the first reference points and sets the center information (S31). The information processing device 10 can acquire the collation information including the frequency information that takes account of the influence resulting from the rotation or movement, with respect to the base point, of the biometric information represented by the image. More specifically, the CPU 1 sets, as the first reference point Q1, a point which is in the direction of the base point (the feature point) in relation to the base point P and whose distance from the base point P is the first predetermined value L1. Taking the first reference point Q1 as the starting point, the CPU 1 sequentially sets the first reference points Qn (where n is an integer from 2 to 63) clockwise on the circle whose center is the base point P and whose radius is the first predetermined value L1. Further, the center information of the present example is the order of acquisition of the first reference points Qn. Between the first reference point Q of the reference frequency information acquired under these conditions and the first reference point Q1 of the test frequency information, the influence resulting from directional displacement of the test image with respect to the reference image at the time of image acquisition is cancelled out. Therefore, the information processing device 10 can easily determine the correspondence between the reference frequency information and the test frequency information, without performing complicated processing. Taking account of the influence resulting from the rotation or movement of the information represented by the image with respect to the base point, the information processing device 10 can compare the test frequency information and the registration frequency information and can calculate the similarity degree W.

When the size of the image acquired at S21 in FIG. 6 is relatively small, the number of the base points that can be set for the image by the information processing device 10 is small in comparison to when the size of the image is relatively large. Meanwhile, a case is also assumed in which the second reference points are set outside the image in relation to the base point, depending on the size of the image, the coordinates of the base point, the first predetermined value and the second predetermined value. From the viewpoint of efficiently and effectively acquiring the frequency information using a small number of the base points, it is preferable that the degree of similarity can be calculated even when some of the second reference points are set outside the image. The information processing device 10 of the present embodiment performs the processing from S55 to S63 and the processing at S65 in FIG. 18, and thus calculates the similarity degree W while taking account of the first reference point Q for which the second reference points are set outside the image. Therefore, even when the information processing device 10 has the first reference point Q for which the second reference points R are set outside the image, the information processing device 10 can acquire the frequency information for that base point. The similarity degree W can be calculated appropriately on the basis of the acquired frequency information.

3. Verification of Effects

Figure 23:
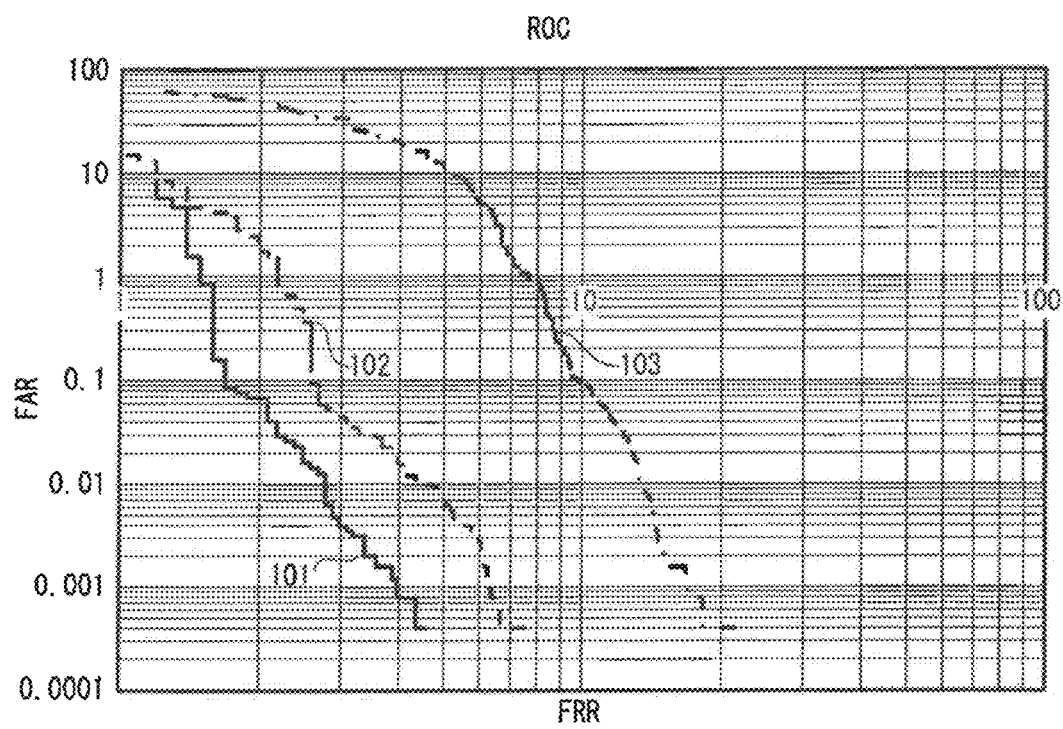
FIG. 23 is a graph that compares receiver operating characteristics (ROC) of a method of the present example and a known method.

Receiver operating characteristics (ROC) were compared between the method of the first embodiment and the known method. The comparison result is shown in FIG. 23. A line 101 in the drawing indicates the method of the first embodiment. A line 102 indicates a result of the known method. A line 103 is a result when, in the known method, a weighting of the type (the endpoint, the branch point) of the base point and the direction of the base point is set to 0. In the known method, the correspondence of the base points is determined on the basis of the weighting of the type (the end point, the branch point) of the base point and the direction of the base point, and the collation score is calculated. As shown in FIG. 23, it is indicated that, when the method of the first embodiment is used, an authentication accuracy that is preferable to that of the known method is obtained. More specifically, it is confirmed that, when the correspondence of the base points is determined using the frequency information and the collation score is calculated, the authentication accuracy is higher than when the correspondence of the base points is determined on the basis of the weighting of the type (the endpoint, the branch point) of the base point and the direction of the base point and the collation score is calculated.

Figure 24:
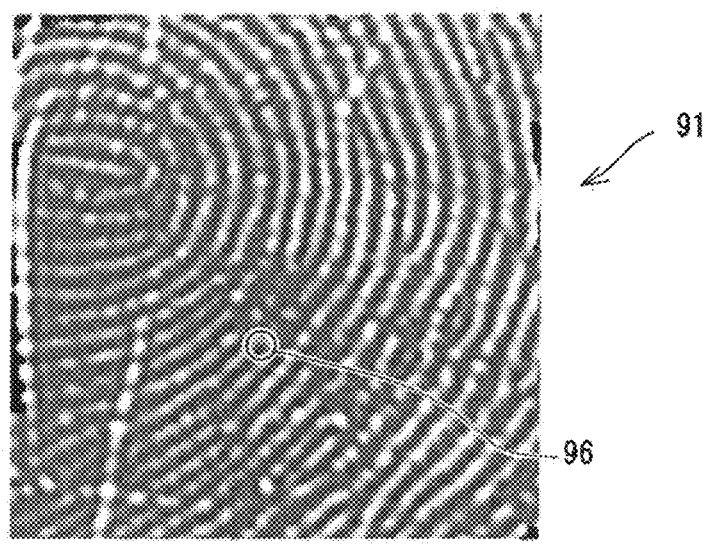
FIG. 24 is an image representing test biometric information acquired from the biometric information acquisition device 8.

Collation information processing according to the second embodiment will be explained. Different steps between the collation information processing of the first embodiment and the collation information processing of the second embodiment are S28 of the image analysis processing in FIG. 6, S31 of the frequency information acquisition processing in FIG. 8, S114 and S115 of the similarity degree V calculation processing in FIG. 17, and S51 of the similarity degree W calculation processing in FIG. 18, and other processing steps are the same. An explanation of the same processing as the collation information processing of the first embodiment is omitted here. The processing different from the collation information processing of the first embodiment will be explained. As an example, a case will be explained in which the image 41 shown in FIG. 7 is acquired as the reference image and an image 91 shown in FIG. 24 is acquired as the test image. In the same manner as in the first embodiment, when the CPU 1 of the information processing device 10 detects the input of the start command of the collation information processing, the CPU 1 reads out, to the RAM 3, the information processing program to execute the collation information processing stored in the flash memory 4, and performs processing of each of steps to be described below in accordance with instructions included in the information processing program.

At S28 of the image analysis processing in FIG. 6, the CPU 1 acquires the coordinates of the base point and does not acquire the direction of the base point (S28). In the frequency information acquisition processing in FIG. 8, the CPU 1 determines the first reference points for the base point acquired at S28 in FIG. 6 (S31). In the present example, the CPU 1 determines, as the first reference points Qn, 63 points whose distance from the base point P is the first predetermined value L1. In the present example, the first reference point Q1 is a point whose distance from the base point P is the first predetermined value L1 and which is in a predetermined direction in relation to the base point P. The predetermined direction is a direction determined in advance in relation to the base point P, and is the rightward direction in the present example. The first reference points Q2 to Q63 are points that are arranged at equal intervals clockwise, in that order, from the first reference point Q1. At S39 that is similar to that of the first embodiment, a sample image 48 in FIG. 25 is generated on the basis of the reference image 41. A sample image 98 is generated on the basis of the test image 91. At S41 that is similar to that of the first embodiment, a frequency image 49 in FIG. 25 is generated on the basis of the reference image 41. A frequency image 99 is generated on the basis of the test image 91.

At S114 of the similarity degree V calculation processing in FIG. 17, the CPU 1 respectively calculates the distance difference CD and the angle difference AD between the test proximity base point and the reference proximity base point selected at S113 (S114). The CPU 1 calculates VK on the basis of Expression (1)'.

$$VK = Vh - (VC \times CD + VA \times AD) \qquad \text{Expression (1)'}$$

In Expression (1)', Vh and VA are the same as those in Expression (1). Note however that, when one of the differences CD and AD is equal to or more than a threshold value that is individually set, the CPU 1 sets VK to 0.

Figure 26:
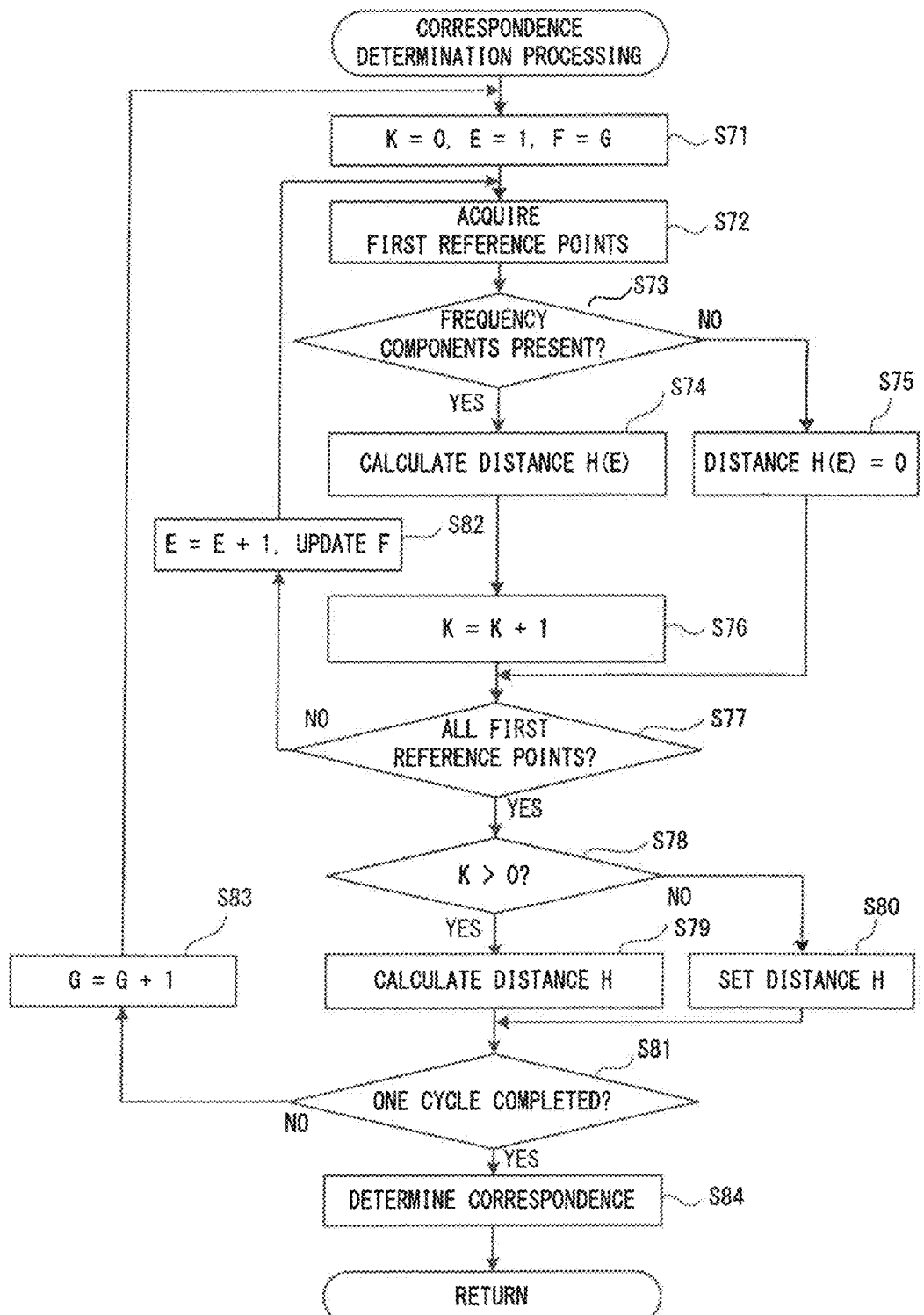
FIG. 26 is a flowchart of correspondence determination processing that is performed in the similarity degree W calculation processing shown in FIG. 18 according to the second embodiment.

At S51 of the similarity degree W calculation processing in FIG. 18, correspondence determination processing shown in FIG. 26 is performed. In the frequency information of the second embodiment, the center information is not set based on the direction of the base point (the feature point). Therefore, in the second embodiment, it is necessary to calculate the similarity degree W while taking account of the fact that the direction of the biometric information is different between the reference image and the test image. As shown in FIG. 26, the CPU 1 sets the variable K to 0, sets the variable E to 1, and sets the variable F to a variable G (S71). The variable K is a variable representing the number of the first reference points (the center information) of which the frequency components are compared in the similarity degree W calculation processing. The variable E is a variable to sequentially read out the first reference points of the reference frequency information. The variable F is a variable to sequentially read out the first reference points of the test frequency information. The variable G is a variable to define a starting position when the first reference points of the test frequency information are sequentially read out. An initial value of the variable G is 1.

Figure 27:
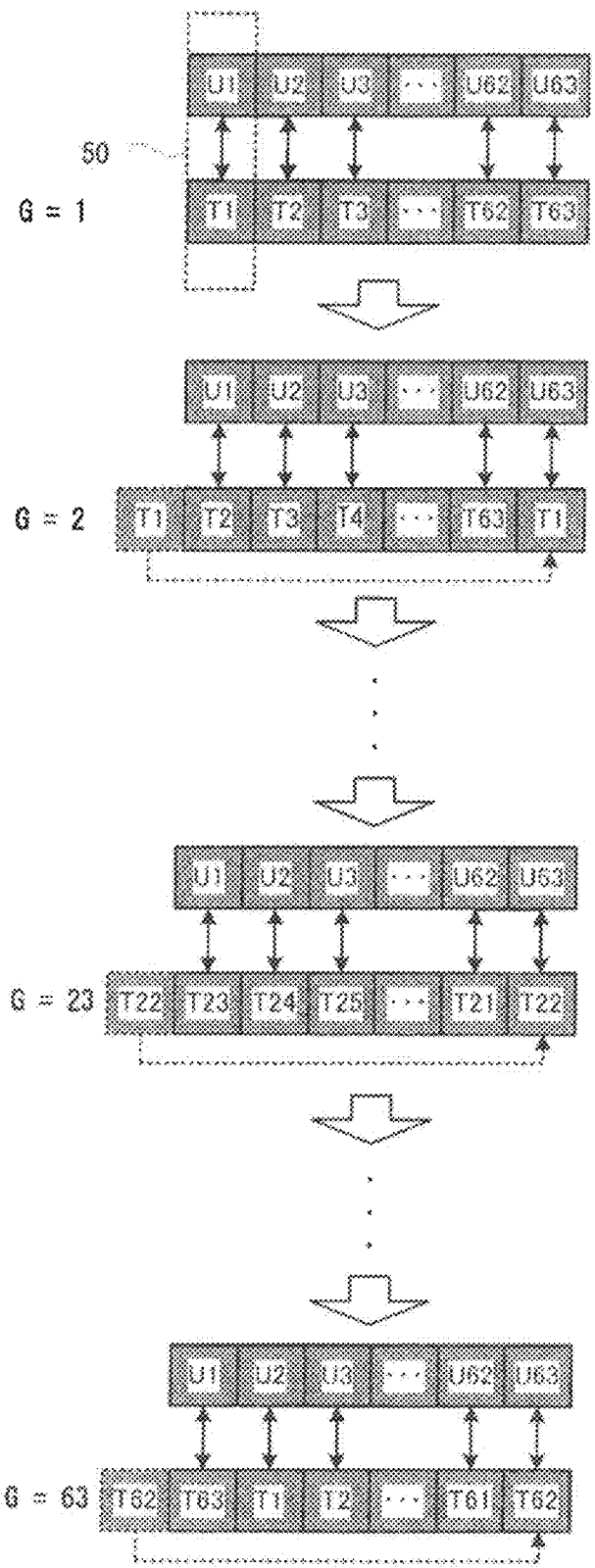
FIG. 27 is an explanatory diagram of a process that determines a correspondence in the correspondence determination processing according to the second embodiment.

The CPU 1 acquires an E-th first reference point of the reference frequency information, and an F-th first reference point of the test frequency information (S72). When the variable E is 1 and the variable F is 1, a reference frequency component U1 and a test frequency component T1, which are shown as a combination 50 in FIG. 27, are acquired. The CPU 1 determines whether or not the reference frequency component UE corresponding to the E-th first reference point and the test frequency component TF corresponding to the F-th first reference point are both present (S73). In FIG. 27, in the same manner as in FIG. 20, hatching is applied to the blocks of the reference frequency components UE or the test frequency components TF corresponding to the first reference points (more specifically, the first reference points having the frequency components) for which the sample information was acquired at S36 in FIG. 8. When both of them are present (yes at S73), the CPU 1 calculates a distance between them as the degree of similarity between the reference frequency component UE corresponding to the E-th first reference point and the test frequency component TF corresponding to the F-th first reference point (S74). The CPU 1 of the present example calculates a Euclidean distance H(E). When the number of elements is 1 to N/2, the frequency components UE are represented by Expression (3), and the frequency components TF are represented by Expression (4), the Euclidean distance H(E) is calculated on the basis of Expression (5).

$$\text{Frequency components } UE = \{UE(1), UE(2), \ldots, UE(N/2)\} \qquad \text{Expression (3)}$$

$$\text{Frequency components } TF = \{TF(1), TF(2), \ldots, TF(N/2)\} \qquad \text{Expression (4)}$$

$$\text{Euclidean distance } H(E) = \sqrt{\{(UE(1) - TF(1))^2 + (UE(2) - TF(2))^2 + \ldots + (UE(N/2) - TF(N/2))^2\}} \qquad \text{Expression (5)}$$

The CPU 1 increments the variable K by 1 (S76). When it is not determined that the reference frequency component UE corresponding to the E-th first reference point and the test frequency component TF corresponding to the F-th first reference point are both present (no at S73), the CPU 1 sets the Euclidean distance H(E) to 0 (S75). After S75 or S76, the CPU 1 determines whether or not all the first reference points corresponding to the center information included in the reference frequency information have been acquired at S72 (S77). When it is not determined that all the first reference points of the reference frequency information have been acquired at S72 (no at S77), the CPU 1 increments the variable E by 1. The CPU 1 updates the variable F (S82). The update of the variable F is performed in the following manner. When the variable F is one of the integers from 1 to 62, the CPU 1 increments the variable F by 1. When the variable F is 63, the CPU 1 sets the variable F to 1. After S82, the CPU 1 returns the processing to S72.

When all the first reference points of the reference frequency information have been acquired by the processing at S72 (yes at S77), the CPU 1 determines whether or not the variable K is larger than 0 (S78). When the variable K is not larger than 0 (no at S78), the CPU 1 sets the distance H to a predetermined value, and stores the set distance H and the variable G in association with each other (S80). When the variable K is larger than 0 (yes at S78), the CPU 1 calculates the distance H (S79). Specifically, the CPU 1 calculates the sum of the Euclidean distances H(E) calculated at S74, and the value obtained by multiplying the calculated sum by $(Hp/K)^{ZA}$ is taken as the distance H. Hp is a predetermined value. ZA is a weighting factor and is a value larger than 0. The distance H is calculated while taking account of the number of the first reference points (the center information) of which the frequency components are compared in the similarity degree W calculation processing. In comparison to when the variable K is large, the smaller the variable K, the larger the value $(Hp/K)^{ZA}$. The CPU 1 stores the calculated distance H and the variable G in association with each other. After the processing at S79 or S80, the CPU 1 determines whether or not one cycle of the processing is completed (S81). When the variable G shown in FIG. 27 is 63, the CPU 1 determines that one cycle of the processing is completed. When one cycle of the processing is not completed (no at S81), the CPU 1 increments the variable G by 1 (S83). After S83, the CPU 1 returns the processing to S71. As shown in FIG. 27, in the processing that is performed after the processing at S83, the Euclid distance H(E) is calculated in a combination in which the center information of the test frequency information corresponding to the reference frequency information whose center information is 1 is shifted by one to the larger side (to the left side in the drawing) in comparison to the previous processing. In a current cycle of processing, the center information of the test frequency information corresponding to the reference frequency information whose center information is 1 in the previous processing is set to the center information of the test frequency information corresponding to the reference frequency information whose center information is 63.

Figure 28:
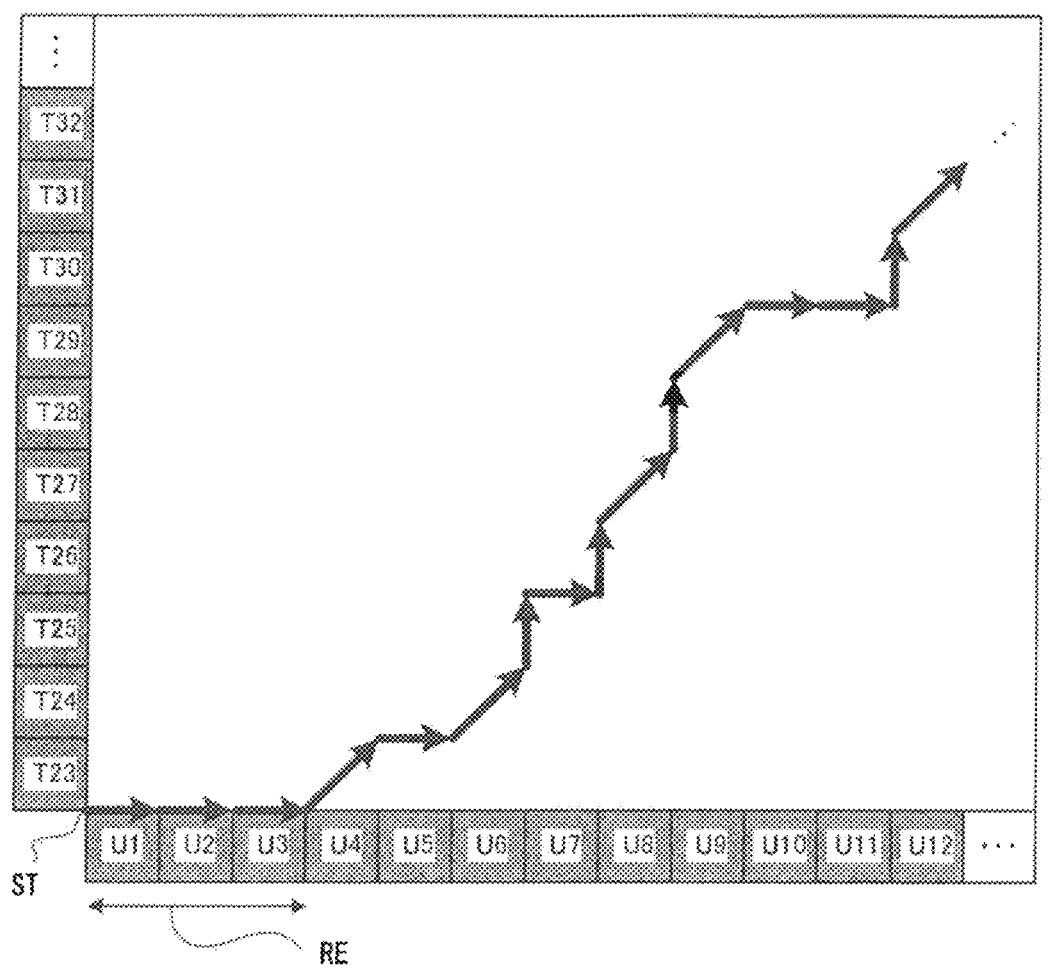
FIG. 28 is an explanatory diagram schematically showing a process that selects a matching path on the basis of the correspondence determined by the correspondence determination processing shown in FIG. 26.

When one cycle of the processing is completed (yes at S81), the CPU 1 determines the correspondence between the reference frequency information and the test frequency information, on the basis of the variable G for which the distance H calculated at S79 is the smallest (S84). Specifically, the CPU 1 determines that the variable G corresponding to the distance H whose value is the smallest among the distance H calculated at S79 or the distance H set at S80, as the center information of the test frequency information corresponding to the reference frequency information whose center information is 1. When the variable G for which the distance H calculated at S79 is the smallest, is 23, as shown in FIG. 27, the center information of the test frequency information corresponding to the reference frequency information whose center information is 1 is 23. Then, the CPU 1 ends the correspondence determination processing and returns the processing to the similarity degree W calculation processing in FIG. 18. In the similarity degree W calculation processing in FIG. 18, the similarity degrees V and W between the reference frequency information and the test frequency information are calculated for a case in which the test frequency information is rearranged, as schematically shown in FIG. 28, so that the center information of the test frequency information corresponding to the reference frequency information whose center information is 1 is 23. A notation method of each of the blocks in FIG. 28 is the same as that in FIG. 20.

In the collation information processing of the second embodiment, the CPU 1 and the flash memory 4 respectively correspond to the processor and the storage portion of the present disclosure. The processing at S21 in FIG. 6 corresponds to the image acquisition step of the present disclosure. The CPU 1 that performs the processing at S21 functions as the image acquisition portion of the present disclosure. The processing at S27 corresponds to the base point determination step of the present disclosure. The CPU 1 that performs the processing at S27 functions as the base point determination portion of the present disclosure. The processing from S31 to S37 in FIG. 8 corresponds to the sample information acquisition step of the present disclosure. The CPU 1 that performs the processing from S31 to S37 functions as the sample information acquisition portion of the present disclosure. The processing at S40 in FIG. 8 corresponds to the frequency information acquisition step of the present disclosure. The CPU 1 that performs the processing at S40 functions as the frequency information acquisition portion of the present disclosure. The processing at S42 in FIG. 8 and the processing at S14 in FIG. 5 correspond to the storage control step of the present disclosure. The CPU 1 that performs the processing at S42 and the processing at S14 functions as the storage control portion of the present disclosure. The processing at S22 in FIG. 6 corresponds to the extraction step of the present disclosure. The processing at S51 in FIG. 18 corresponds to the correspondence determination step of the present disclosure. The processing at S63 in FIG. 18 corresponds to the similarity degree calculation step of the present disclosure. The processing at S31 in FIG. 8 corresponds to the first setting step of the present disclosure. The processing at S33 corresponds to the second setting step of the present disclosure. The processing at S34 corresponds to the determination step of the present disclosure. The processing at S36 corresponds to the acquisition step of the present disclosure. The processing at S57 corresponds to the first similarity degree calculation step of the present disclosure. The processing at S65 corresponds to the second similarity degree calculation step of the present disclosure. The processing at S63 corresponds to the information similarity degree calculation step of the present disclosure.

According to the collation information processing of the second embodiment, the information processing device 10 can appropriately compare the reference frequency information and the test frequency information, without using the direction of the base point (the feature point). In the above-described second embodiment, the explanation is given for the case in which the information processing device 10 uses the feature point as the base point. However, when the image acquired at S21 in FIG. 6 is relatively small, there is a case in which a number of feature points that is sufficient to perform the collation cannot be obtained. In this type of case, it is conceivable that the information processing device 10 acquires the frequency information, as the base point, a given point other than the feature point. Even in this type of case, by performing the correspondence determination processing of the second embodiment, the information processing device 10 can calculate the similarity degree W while taking account of directional displacement of the image, and can perform the collation using the similarity degree W.

The information processing device and the non-transitory computer-readable medium storing the information processing program according to the present disclosure is not limited to the embodiments described above, and various types of modifications may be made insofar as they are within the scope of the present disclosure. For example, the modifications (A) to (C) described below may be made as desired.

(A) The configuration of the information processing device 10 may be changed as appropriate. For example, the information processing device 10 is not limited to a smart phone, and may be a mobile device, such as a notebook PC, a tablet PC or a mobile telephone, for example, or may be a device such as an automated teller machine (ATM) or an entrance and exit management device. The biometric information acquisition device 8 may be provided separately from the information processing device 10. In this case, the biometric information acquisition device 8 and the information processing device 10 may be connected by a connection cable, or may be wirelessly connected, such as with Bluetooth (registered trademark) or near field communication (NFC). The detection method of the biometric information acquisition device 8 is not limited to the capacitance method, and may be another method (for example, an electric field method, a pressure method, or an optical method). The biometric information acquisition device 8 is not limited to the surface type, and may be a linear type. The size, the color information and the resolution of the image generated by the biometric information acquisition device 8 may be changed as appropriate. Therefore, for example, the color information may be information corresponding to a color image, as well as information corresponding to a white and black image.

(B) The information processing program may be stored in a storage device of the information processing device 10 before the information processing device 10 executes the programs. Therefore, the methods by which the information processing programs are acquired, the routes by which they are acquired, and the device in which the programs are stored may each be modified as desired. The information processing programs, which are executed by the processor of the information processing device 10, may be received from another device through one of a cable and wireless communications, and they may be stored in a storage device such as a flash memory or the like. The other device may be, for example, a personal computer (PC) or a server that is connected through a network.

(C) The individual steps in the collation information processing may not necessarily be performed by the CPU 1, and some or all of the steps may also be performed by another electronic device (for example, an ASIC). The individual steps of the collation information processing may also be performed by distributed processing among a plurality of electronic devices (for example, a plurality of CPUs). The order of the individual steps in the collation information processing can be modified as necessary, and steps can be omitted and added. A case in which an operating system (OS) or the like that is operating in the information processing device 10 performs some or all of the actual processing, based on commands from the CPU 1 of the information processing device 10, and the functions of the embodiment that is described above are implemented by that processing, falls within the scope of the present disclosure. The modifications hereinafter described in paragraphs (C-1) to (C-8) may also be applied to the main processing as desired.

(C-1) Pre-processing may be performed, as appropriate, on the image acquired at S11. For example, filtering processing may be performed in order to remove high frequency components of the image as noise. As a result of performing the filtering processing, gradation changes in edge portions of the image become moderate. One of a known low pass filter, a Gaussian filter, a moving average filter, a median filter and an averaging filter may be used as a filter used for the filtering processing. In another example, the filtering processing to extract specific frequency band components only may be performed on the image acquired at S11. A band including a ridge and trough period of the fingerprint may be selected as the specific frequency band. In this case, a known band-pass filter can be taken as an example of the filter used for the filtering processing.

(C-2) The frequency components are not limited to the one-dimensional group delay spectrum. For example, as the frequency components, other known frequency components may be used, such as an LPC spectrum, a group delay spectrum, an LPC cepstrum, a cepstrum, an autocorrelation function, a cross-correlation function and the like.

(C-3) The method for calculating the similarity degree of the frequency information may be changed as appropriate. For example, when a one-dimensional group delay spectrum similar to that of the above-described embodiment is used as the frequency components, there is a case in which noise components appear strongly in higher order components. Taking this type of case into consideration, the frequency information may be selected on the basis of the frequency information including a predetermined number of components that are selected while prioritizing lower order components. The predetermined number may be determined in advance while taking the sample number, the authentication accuracy and the like into consideration. For example, when the number N of the samples that are acquired for one of the first reference points is 128, the predetermined number is set to one of the values from 10 to 63. Preferably, the predetermined number is set to one of the values from 12 to 20. When the sample number is N, preferably, the predetermined number is set to a value from (sample number N/10) to (sample number N/5).

(C-4) The setting conditions (for example, the number, the interval, the order of acquisition and the like) of the first reference points and the second reference points may be changed as appropriate. In order to reduce the influence of the directional displacement of the test image with respect to the reference image at the time of image acquisition, it is preferable that the second reference points be set sufficiently close to each other. It is particularly preferable that the interval between the second reference points that are adjacent to each other be set to approximately one pixel. The center information and the position information may be changed as appropriate.

(C-5) The method for calculating the similarity degree W at S63 may be changed as appropriate. For example, the similarity degree may be calculated on the basis of Expression (6) below.

$$W = Vs \times \{1 - (L3/2C)^Z\} + Ws \times (Dth-D)/Dth \times (L3/2C)^Z \quad \text{Expression (6)}$$

In Expression (6), Vs is the similarity degree calculated from coordinates of the proximity base points. Vs may be calculated on the basis of the known method (refer to Japanese Patent No. 1476134, for example). Ws, Dth, C and Z are the same as those in Expression (2).

(C-6) The collation information including the frequency information need not necessarily be used in the processing to calculate the similarity degree W. It is sufficient that the collation information includes the frequency information, and the other information may be changed as appropriate. As long as the base point is a point in the image, the base point need not necessarily be the feature point. The base point may be, for example, a point of predetermined coordinates in the image. In this case, the direction of the base point may be set on the basis of the color of the surrounding pixels of the base point, or the direction of the base point may not be set. On the basis of the direction of the base point, the first reference points may be set or may not be set. Various threshold values and predetermined values may be set as appropriate.

(C-7) The distance H in FIG. 26 may be changed as appropriate. For example, the sum of the absolute values of differences between the frequency components of the test frequency information and the frequency components of the reference frequency information, i.e., a Hamming distance may be acquired as the distance H.

(C-8) The collation may be performed in combination with known collation information. For example, a collation result obtained by a known minutiae method may be combined with a collation result obtained by the collation information method of the present disclosure, and a final determination may be made. In this way, the collation is performed from a variety of viewpoints and an improvement in the collation accuracy is expected.

What is claimed is:

1. A non-transitory computer-readable medium storing computer-readable instructions that are executed by a processor provided in an information processing device comprising a storage portion, the computer-readable instructions, when executed, instructing the processor to perform processes comprising:
   an image acquisition step of acquiring an image;
   a base point determination step of determining a base point from the image acquired by the image acquisition step;
   a sample information acquisition step of acquiring sample information that is information indicating a change in color information of a surrounding area of the base point determined by the base point determination step, the sample information acquisition step including
      acquiring a sample for each of a plurality of second reference points whose positions are different from each other, the sample being information that associates color information corresponding to the second reference points, which are points on a circumference of a circle whose center is a first reference point and whose radius is a second predetermined value, with position information that is information corresponding to the positions on the image of the second reference points, the first reference point being a point in the image whose distance from the base point is a first predetermined value, and acquiring, as the sample information, information that associates the acquired plurality of samples with center information that is information corresponding to a position on the image of the first reference point;

a frequency information acquisition step of acquiring frequency information that is generated on the basis of the sample information for each of a plurality of the first reference points acquired by the sample information acquisition step, the frequency information acquisition step including calculating a frequency component of a change in the color information with respect to the position information, for each of the plurality of first reference points, and acquiring the frequency information that is information that associates the calculated frequency component with the center information; and a storage control step of causing the storage portion to store the frequency information acquired by the frequency information acquisition step, as collation information used for collation of biometric information.

2. The non-transitory computer-readable medium according to claim 1, wherein the computer-readable instructions further instruct the processor to perform processes comprising:

an extraction step of extracting a feature point by analyzing the image acquired by the image acquisition step, wherein the base point determination step determines the feature point extracted by the extraction step to be the base point.

3. The non-transitory computer-readable medium according to claim 2, wherein the computer-readable instructions further instruct the processor to perform processes comprising:

a direction acquisition step of acquiring a direction of the feature point extracted by the extraction step, wherein in the sample information acquisition step, the center information is set on the basis of the direction of the feature point acquired by the direction acquisition step.

4. The non-transitory computer-readable medium according to claim 3, wherein the computer-readable instructions further instruct the processor to perform processes comprising:

a correspondence determination step of determining a positional correspondence, which is a correspondence between the position information of the frequency information for testing, which is used for the collation of the biometric information, and the position information of the frequency information for reference, which is stored in the storage portion; and a similarity degree calculation step of calculating an information similarity degree, which is a degree of similarity between the frequency information for testing and the frequency information for reference, on the basis of the positional correspondence determined by the correspondence determination step.

5. The non-transitory computer-readable medium according to claim 4, wherein the sample information acquisition step includes a first setting step of setting the plurality of first reference points for the base point in accordance with a first predetermined condition, a second setting step of setting the plurality of second reference points for each of the plurality of first reference points set by the first setting step, in accordance with a second predetermined condition, a determination step of determining, for each of the plurality of first reference points, whether all the plurality of second reference points set by the second setting step are within the image, and an acquisition step of acquiring the sample information relating to the first reference point, of the plurality of first reference points, for which it is determined by the determination step that all the plurality of second reference points are within the image, and the similarity degree calculation step includes a first similarity degree calculation step of calculating, on the basis of, from among the frequency information for testing, the frequency information relating to at least one point in the image, which is the first reference point, for which it is determined by the determination step that all the plurality of second reference points are within the image, and on the basis of the correspondence determined by the correspondence determination step, a first similarity degree between the frequency information for testing relating to the at least one point in the image and the frequency information for reference, and a second similarity degree calculation step of calculating, on the basis of, from among the frequency information for testing, the frequency information relating to at least one point outside the image, which is the first reference point, for which it is not determined by the determination step that all the plurality of second reference points are within the image, and on the basis of the correspondence determined by the correspondence determination step, a second similarity degree between the frequency information for testing relating to the at least one point outside the image and the frequency information for reference, and an information similarity degree calculation step of calculating the information similarity degree on the basis of the first similarity degree and the second similarity degree.

6. The non-transitory computer-readable medium according to claim 2, wherein the computer-readable instructions further instruct the processor to perform processes comprising:

a correspondence determination step of determining a positional correspondence, which is a correspondence between the position information of the frequency information for testing, which is used for the collation of the biometric information, and the position information of the frequency information for reference, which is stored in the storage portion; and a similarity degree calculation step of calculating an information similarity degree, which is a degree of similarity between the frequency information for testing and the frequency information for reference, on the basis of the positional correspondence determined by the correspondence determination step.

7. The non-transitory computer-readable medium according to claim 6, wherein the sample information acquisition step includes a first setting step of setting the plurality of first reference points for the base point in accordance with a first predetermined condition, a second setting step of setting the plurality of second reference points for each of the plurality of first reference points set by the first setting step, in accordance with a second predetermined condition, a determination step of determining, for each of the plurality of first reference points, whether all the plurality of second reference points set by the second setting step are within the image, and an acquisition step of acquiring the sample information relating to the first reference point, of the plurality of first reference points, for which it is determined by the determination step that all the plurality of second reference points are within the image, and the similarity degree calculation step includes a first similarity degree calculation step of calculating, on the basis of, from among the frequency information for testing, the frequency information relating to at least one point in the image, which is the first reference point, for which it is determined by the determination step that all the plurality of second reference points are within the image, and on the basis of the correspondence determined by the correspondence determination step, a first similarity degree between the frequency information for testing relating to the at least one point in the image and the frequency information for reference, and a second similarity degree calculation step of calculating, on the basis of, from among the frequency information for testing, the frequency information relating to at least one point outside the image, which is the first reference point, for which it is not determined by the determination step that all the plurality of second reference points are within the image, and on the basis of the correspondence determined by the correspondence determination step, a second similarity degree between the frequency information for testing relating to the at least one point outside the image and the frequency information for reference, and an information similarity degree calculation step of calculating the information similarity degree on the basis of the first similarity degree and the second similarity degree.

8. The non-transitory computer-readable medium according to claim 1, wherein the computer-readable instructions further instruct the processor to perform processes comprising:

a correspondence determination step of determining a positional correspondence, which is a correspondence between the position information of the frequency information for testing, which is used for the collation of the biometric information, and the position information of the frequency information for reference, which is stored in the storage portion; and a similarity degree calculation step of calculating an information similarity degree, which is a degree of similarity between the frequency information for testing and the frequency information for reference, on the basis of the positional correspondence determined by the correspondence determination step.

9. The non-transitory computer-readable medium according to claim 8, wherein the sample information acquisition step includes a first setting step of setting the plurality of first reference points for the base point in accordance with a first predetermined condition, a second setting step of setting the plurality of second reference points for each of the plurality of first reference points set by the first setting step, in accordance with a second predetermined condition, a determination step of determining, for each of the plurality of first reference points, whether all the plurality of second reference points set by the second setting step are within the image, and an acquisition step of acquiring the sample information relating to the first reference point, of the plurality of first reference points, for which it is determined by the determination step that all the plurality of second reference points are within the image, and the similarity degree calculation step includes a first similarity degree calculation step of calculating, on the basis of, from among the frequency information for testing, the frequency information relating to at least one point in the image, which is the first reference point, for which it is determined by the determination step that all the plurality of second reference points are within the image, and on the basis of the correspondence determined by the correspondence determination step, a first similarity degree between the frequency information for testing relating to the at least one point in the image and the frequency information for reference, and a second similarity degree calculation step of calculating, on the basis of, from among the frequency information for testing, the frequency information relating to at least one point outside the image, which is the first reference point, for which it is not determined by the determination step that all the plurality of second reference points are within the image, and on the basis of the correspondence determined by the correspondence determination step, a second similarity degree between the frequency information for testing relating to the at least one point outside the image and the frequency information for reference, and an information similarity degree calculation step of calculating the information similarity degree on the basis of the first similarity degree and the second similarity degree.

10. An information processing device, comprising:

a storage portion;

an image acquisition portion that acquires an image;

a base point determination portion that determines a base point from the image acquired by the image acquisition portion;

a sample information acquisition portion that acquires sample information that is information indicating a change in color information of a surrounding area of the base point determined by the base point determination portion, the sample information acquisition portion that acquires a sample for each of a plurality of second reference points whose positions are different from each other, the sample being information that associates color information corresponding to the second reference points, which are points on a circumference of a circle whose center is a first reference point and whose radius is a second predetermined value, with position information that is information corresponding to the positions on the image of the second reference points, the first reference point being a point in the image whose distance from the base point is a first predetermined value, and that acquires, as the sample information, information that associates the acquired plurality of samples with center information that is information corresponding to a position on the image of the first reference point;

a frequency information acquisition portion that acquires frequency information that is generated on the basis of the sample information for each of a plurality of the first reference points acquired by the sample information acquisition portion, the frequency information acquisition portion that calculates a frequency component of a change in the color information with respect to the position information, for each of the plurality of first reference points, and that acquires the frequency information that is information that associates the calculated frequency component with the center information; and a storage control portion that causes the storage portion to store the frequency information acquired by the frequency information acquisition portion, as collation information used for collation of biometric information.

* * * * *